US012131284B2

(12) United States Patent
Shimizu et al.

(10) Patent No.: US 12,131,284 B2
(45) Date of Patent: Oct. 29, 2024

(54) INFORMATION PROCESSING METHOD, INFORMATION PROCESSING APPARATUS, AND NON-TRANSITORY COMPUTER READABLE RECORDING MEDIUM STORING INFORMATION PROCESSING PROGRAM

(71) Applicant: Panasonic Intellectual Property Corporation of America, Torrance, CA (US)

(72) Inventors: Toshiyuki Shimizu, Osaka (JP); Naomi Tomiyama, Kyoto (JP); Megumi Mizoguchi, Kyoto (JP); Kenta Murakami, Osaka (JP); Yuki Takaoka, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

(21) Appl. No.: 18/229,931

(22) Filed: Aug. 3, 2023

(65) Prior Publication Data
US 2023/0385748 A1 Nov. 30, 2023

Related U.S. Application Data

(63) Continuation of application No. PCT/JP2022/000949, filed on Jan. 13, 2022.

(30) Foreign Application Priority Data

Feb. 12, 2021 (JP) ................................ 2021-021032

(51) Int. Cl.
*G06Q 10/083* (2024.01)
(52) U.S. Cl.
CPC ................ *G06Q 10/083* (2013.01)

(58) Field of Classification Search
CPC ............. G06Q 10/0836; G06Q 10/087; G06Q 30/0635; H04W 4/029
(Continued)

(56) References Cited

U.S. PATENT DOCUMENTS

2003/0149674 A1* 8/2003 Good ..................... G06Q 10/08
705/402
2017/0265687 A1* 9/2017 Veltrop .................. G05B 15/02
(Continued)

FOREIGN PATENT DOCUMENTS

JP 2002-324117 11/2002
JP 2019-131041 8/2019
(Continued)

OTHER PUBLICATIONS

"Prediction of Food Preparation Time for Smart City" Published by IEEE (Year: 2020).*
(Continued)

*Primary Examiner* — Zeina Elchanti
(74) *Attorney, Agent, or Firm* — Greenblum & Bernstein, P.L.C.

(57) ABSTRACT

A service provider server is configured to receive from a terminal of an orderer order information concerning a product provided by a store, and a type of optional processing applied to the product; determine a deliverer who has a device capable of executing the optional processing, and delivers the product from the store to a delivery destination designated by the orderer; and send to a terminal of the deliverer or the device set information for the device to execute the optional processing applied to the product in a delivery way from the store to the delivery destination.

10 Claims, 18 Drawing Sheets

(58) Field of Classification Search
USPC .................................................. 705/334, 330
See application file for complete search history.

(56) References Cited

U.S. PATENT DOCUMENTS

| | | |
|---|---|---|
| 2019/0236534 A1 | 8/2019 | Kaneko et al. |
| 2020/0247303 A1 | 8/2020 | Qiu et al. |
| 2023/0297906 A1* | 9/2023 | Garcia-Brosa ....... G06Q 20/102 705/7.13 |

FOREIGN PATENT DOCUMENTS

| | | |
|---|---|---|
| JP | 2020-126560 | 8/2020 |
| JP | 2020-135111 | 8/2020 |

OTHER PUBLICATIONS

International Search Report issued in International Patent Application No. PCT/JP2022/000949, dated Mar. 22, 2022, along with an English translation thereof.

* cited by examiner

FIG.3

| TYPE OF OPTIONAL PROCESSING | DEVICE DISCRIMINATION INFORMATION |
|---|---|
| OIL REMOVING PROCESSING | DEVICE A |
| CRISPING PROCESSING | DEVICE B |
| SOFTENING PROCESSING | DEVICE C |

INFORMATION PROCESSING METHOD, INFORMATION PROCESSING APPARATUS, AND NON-TRANSITORY COMPUTER
READABLE RECORDING MEDIUM
STORING INFORMATION PROCESSING
PROGRAM

FIELD OF INVENTION

The present disclosure relates to a technology for determining a deliverer who delivers a product from a store to a delivery destination.

BACKGROUND ART

There has been conventionally known a mobile sales vehicle which allows a product such as bread to be produced while moving to a delivery destination, and allows the produced product to be sold at the delivery destination.

For example, in a delivery vehicle disclosed in Patent Literature 1, a current location is acquired upon receipt of a delivery instruction of a product to a delivery destination, an expective arrival time when the delivery vehicle is expected to arrive at the delivery destination is estimated on the basis of the current location and the delivery destination, a movement from the current location to the delivery destination is started, and the product is produced so that the expective arrival time coincides with a completion time of the production of the product.

However, a further improvement has been demanded because the conventional technology does not take into consideration processing a product according to a variety of taste of an orderer in a delivery way.

Patent Literature 1: Japanese Unexamined Patent Publication No. 2019-131041

SUMMARY OF THE INVENTION

The present disclosure has been worked out in order to solve the problem described above, and an object thereof is to provide a technology which can provide a product that satisfies a variety of taste of an orderer.

An information processing method according to an aspect of the present disclosure includes, by a computer: receiving from a terminal of an orderer order information concerning a product provided by a store and a type of optional processing applied to the product; determining a deliverer who has a device capable of executing the optional processing, and delivers the product from the store to a delivery destination designated by the orderer; and sending to a terminal of the deliverer or the device set information for the device to execute the optional processing applied to the product in a delivery way from the store to the delivery destination.

The present disclosure can provide a product that satisfies a variety of taste of an orderer.

BRIEF DESCRIPTION OF THE DRAWINGS

FIG. 3 is a table showing exemplary option information to be stored in an option information storage part according to the present embodiment.

DETAILED DESCRIPTION

Knowledge Underlying the Present Disclosure

Figure 1:
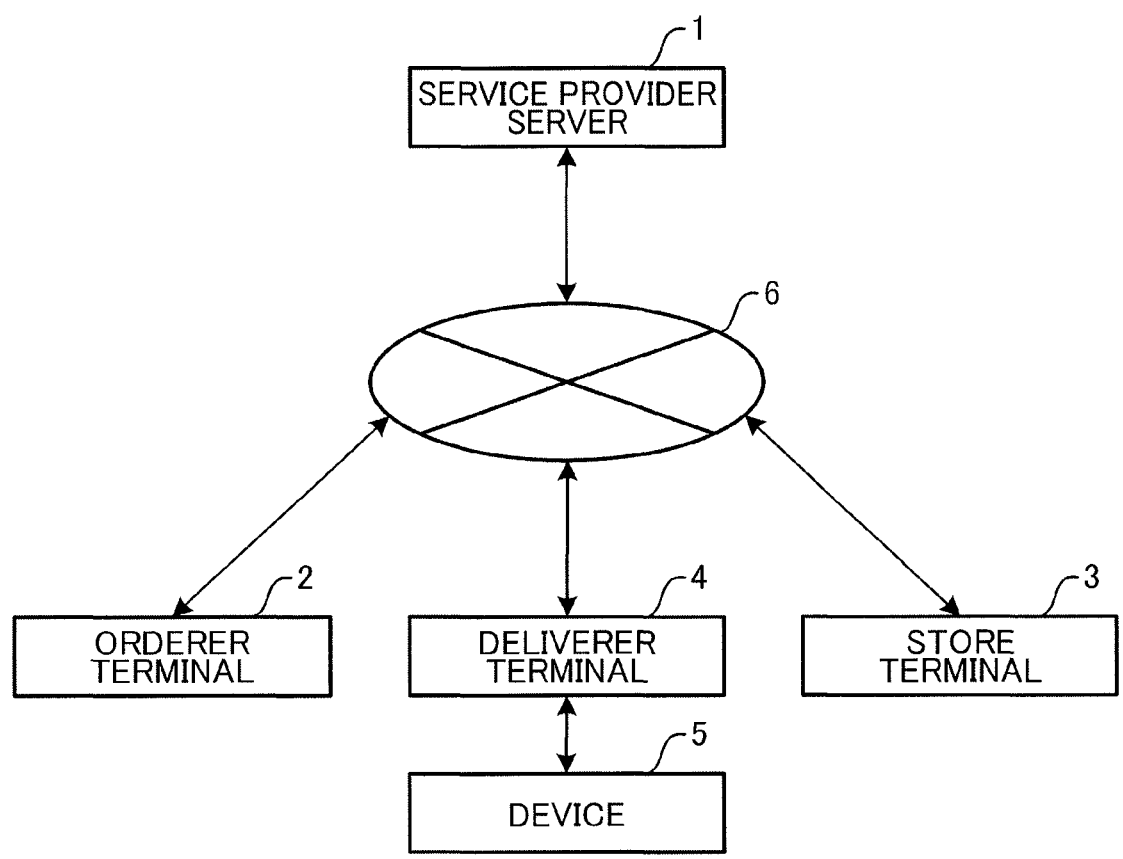
FIG. 1 is a diagram showing a general configuration of a delivery system according to an embodiment of the present disclosure.

In the delivery vehicle according to the conventional technology, in the case that the product is bread, bread is produced by adjusting the temperature and the cooking time of an oven so that the weight lose rate of bread dough falls within a predetermined range, and matching the expective arrival time and the completion time of the production of the product.

However, the conventional technology fails to take into account processing a cooked food according to a variety of taste of an orderer in a delivery way. This is why the conventional technology has had difficulty in providing a product satisfying a variety of taste of an orderer.

In order to solve the problem described above, in the information processing method according to an aspect of the present disclosure, a computer receives, from a terminal of an orderer, order information concerning a product provided by a store and a type of optional processing applied to the product, determines a deliverer who has a device capable of executing the optional processing, and delivers the product from the store to a delivery destination designated by the orderer; and sends to a terminal of the deliverer or the device set information for the device to execute the optional processing applied to the product in a delivery way from the store to the delivery destination.

According to the present configuration, determination is made about a deliverer who has a device capable of executing optional processing to be applied to the product and satisfying a variety of taste of the orderer and delivers the product from a store to a delivery destination designated by the orderer. Subsequently, set information concerning the device to execute the optional processing to be applied to the product in a delivery way from the store to the delivery destination is sent to a terminal of the deliverer or the device. Since the device applies the optional processing to the product using the set information in the delivery way from the store to the delivery destination, a product satisfying a variety of taste of an orderer can be provided.

Further, in the information processing method, the product may include a cooked food or a foodstuff, and the optional processing may include processing of maintaining a state of the cooked food or the foodstuff, or processing of changing the state of the cooked food or the foodstuff.

According to the present configuration, since the processing of maintaining the state of the cooked food or the foodstuff, or the processing of changing the state of the cooked food or the foodstuff is performed, a cooked food or a foodstuff satisfying a variety of taste of an orderer can be provided.

Further, in the information processing method, the processing of maintaining the state of the cooked food or the foodstuff, or the processing of changing the state of the cooked food or the foodstuff may include processing of adjusting at least one of a temperature and a water content of the cooked food or the foodstuff.

According to the present configuration, the state of the cooked food or the foodstuff can be maintained owing to the adjustment of at least one of a temperature and a water content of the cooked food or the foodstuff by the device. Further, the state of the cooked food or the foodstuff can be changed owing to the adjustment of at least one of a temperature and a water content of the cooked food or the foodstuff by the device.

Further, in the information processing method, the set information may include information about at least one of a temperature and a humidity every predetermined time in a travel period from the store to the delivery destination.

According to the present configuration, since at least one of a temperature and a humidity every predetermined time in a travel period from the store to the delivery destination is set to the device, at least one of a temperature and a water content of the cooked food or the foodstuff can be adjusted.

Further, in the information processing method, the set information may concern at least one of a frequency and a time of executing a function of the device corresponding to the processing of maintaining the state of the cooked food or the foodstuff, or the processing of changing the state of the cooked food or the foodstuff in the delivery way from the store to the delivery destination.

According to the present configuration, since at least one of a frequency and a time of executing a function of the device is set in the delivery way from the store to the delivery destination, at least one of a temperature and a water content of the cooked food or the foodstuff can be adjusted.

Further, in the information processing method, the computer may further send the order information to a terminal of the store; and may further receive the set information input on the basis of the order information by the terminal of the store.

According to the present configuration, the order information is sent to a terminal of the store. The set information that is input on the basis of the order information by the terminal of the store is received.

Since the set information is input on the basis of the order information by the terminal of the store, reliable set information corresponding to the optional processing can be generated at the store which provides the product.

Further, in the information processing method, it may be appreciated to further set a fee for the optional processing, calculate an expective arrival time when the deliverer is expected to arrive at the delivery destination before the deliverer departs from the store to the delivery destination, acquire an arrival time when the deliverer actually arrives at the delivery destination, and refuse a payment of the fee from the orderer when a difference between the arrival time and the expective arrival time is not smaller than a predetermined time period.

When the arrival time is a predetermined time or more earlier than the expective arrival time, the optional processing is liable to be still incomplete. When the arrival time is a predetermined time or more later than the expective arrival time, a certain period of time is liable to have elapsed after the completion of the optional processing. In these cases, there is a likelihood that the optional processing is not executed in the normal manner to fail to obtain the expected result of the optional processing. For this reason, the payment of the fee for the optional processing from the orderer is refused when there is a difference of a predetermined time or more between the arrival time and the expective arrival time. Accordingly, the orderer can be kept from being billed for the optional processing that has not been executed in the normal way.

Further, in the information processing method, it may be appreciated to further calculate a first expective arrival time when the deliverer is expected to arrive at the delivery destination, and set the device with the set information for a duration from a time of departing from the store to the first expective arrival time before the deliverer departs from the store to the delivery destination, and calculate a second expective arrival time at a predetermined time point in the delivery way from the store to the delivery destination when the deliverer is expected to arrive at the delivery destination, and send, when the second expective arrival time is later than the first expective arrival time, to the terminal of the deliverer or the device set information of maintaining contents having been set for the predetermined time point in the delivery way in a duration of a time difference between the second expective arrival time and the first expective arrival time.

According to the present configuration, even when it is seen at a predetermined time point in the delivery way that the deliverer is likely to arrive later than the expective arrival time, the set information of maintaining set contents having been set for the predetermined time point is sent to the terminal of the deliverer or the device. Accordingly, the optional processing can be reliably applied to the product.

Further, in the information processing method, in the determination of the deliverer, it may be appreciated to send offer information of catching a deliverer who delivers the product to terminals of delivery candidates, receive application information including device discrimination information of discriminating a device held by a delivery candidate from the terminal of the delivery candidate, judge on the basis of the device discrimination information as to whether the device is capable of executing the optional processing, and determine the delivery candidate to be the deliverer when the device is judged to execute the optional processing.

According to the present configuration, the device discrimination information of discriminating a device held by a delivery candidate is received from a terminal of the delivery candidate, and the delivery candidate is determined to be the deliverer when the device is judged to be capable of executing the optional processing on the basis of the device discrimination information. Accordingly, a deliverer who has a device capable of executing the optional processing can be reliably determined.

Further, the present disclosure may be accomplished not only as the information processing method for executing the characteristic process described above, but also as an information processing apparatus including the characteristic configuration corresponding to the characteristic process executed in the information processing method. Additionally, the present disclosure may be accomplished as a computer program causing a computer to execute the characteristic process included in the information processing method. Therefore, the same advantageous effects as the information processing method can be established in the following aspects.

An information processing apparatus according to another aspect of the present disclosure includes a reception part for receiving from a terminal of an orderer order information concerning a product provided by a store, and a type of optional processing applied to the product; a determination part for determining a deliverer who has a device capable of executing the optional processing, and delivers the product from the store to a delivery destination designated by the orderer; and a sending part for sending to a terminal of the deliverer or the device set information for the device to execute the optional processing applied to the product in a delivery way from the store to the delivery destination.

A non-transitory computer readable recording medium storing an information processing program according to still another aspect of the present disclosure causes a computer to execute: receiving from a terminal of an orderer order information concerning a product provided by a store, and a type of optional processing applied to the product; determining a deliverer who has a device capable of executing the optional processing, and delivers the product from the store to a delivery destination designated by the orderer; and sending to a terminal of the deliverer or the device set information for the device to execute the optional processing applied to the product in a delivery way from the store to the delivery destination.

Hereinafter, an embodiment of the present disclosure will be described with reference to the accompanied drawings. It should be noted that the below-described embodiment is a specific example of the present disclosure, and will not delimit the technical scope of the present disclosure.

Embodiment

FIG. 1 is a diagram showing a general configuration of a delivery system according to an embodiment of the present disclosure.

A delivery system shown in FIG. 1 includes a service provider server 1, an orderer terminal 2, a store terminal 3, a deliverer terminal 4, and a device 5.

The service provider server 1 receives an order of a product provided in a store from an orderer, determines a deliverer who delivers the ordered product from the store to the orderer, and causes the determined deliverer to deliver the product from the store to the orderer. The product is, for example, a cooked food or a foodstuff, and the store is, for example, a restaurant which provides a cooked food or a foodstuff. The service provider server 1 is mutually communicably connected to each of the orderer terminal 2, the store terminal 3, and the deliverer terminal 4 via a network 6. The network 6 is, for example, Internet. A configuration of the service provider server 1 will be described with reference to FIG. 2.

The orderer terminal 2 is, for example, a smartphone, a tablet-type computer or a personal computer, and is held by the orderer who orders a product provided in the store. The orderer terminal 2 receives an orderer selection of a product provided by the store over a product order screen sent from the service provider server 1, and sends the order of the selected product to the service provider server 1. Further, when the selection of the product is conducted, the orderer terminal 2 receives an orderer selection as to whether or not to execute optional processing to be applied to the product. The orderer terminal 2 receives an input of order information including a product provided by the store and a type of optional processing to be applied to the product, and sends the order information to the service provider server 1.

In a case that products are cooked foods or foodstuffs, the optional processing includes processing of maintaining a state of a cooked food or a foodstuff, or processing of changing the state of a cooked food or a foodstuff. The processing of maintaining the state of a cooked food or a foodstuff, or the processing of changing the state of a cooked food or a foodstuff includes a processing of adjusting at least one of a temperature and a water content of the cooked food or the foodstuff. The optional processing is executed in the delivery way from the store to the delivery destination designated by the orderer. For example, the optional processing includes crisping processing of making the cooked food or the foodstuff crispy, softening processing of softening the cooked food or the foodstuff, or oil removing processing of removing oil from the cooked food or the foodstuff.

When the deliverer departs from the store, the orderer terminal 2 receives from the service provider server 1 deliverer location information indicating a current location of the deliverer. The orderer terminal 2 displays a delivery progress screen showing a current location of the deliverer on the basis of the received deliverer location information. The orderer terminal 2 periodically receives deliverer location information and displays the delivery progress screen during a travel period of the deliverer from the store to the delivery destination. This informs the orderer of the current location of the deliverer to enable the orderer to know when the product will arrive.

The store terminal 3 is, for example, a smartphone, a tablet type computer or a personal computer, and is disposed in a store which provides products. The store terminal 3 receives order information from the service provider server

1, and displays the received order information. The order information includes at least a name of the ordered product and a type of optional processing. Further, when receiving the order information, the store terminal 3 allows a product ready time to be input, and sends the input ready time to the service provider server 1.

Further, the store terminal 3 receives from the service provider server 1 set request information of requesting an input of set information causing the device 5 to execute the optional processing. The store terminal 3 receives an input of the set information causing the device 5 to execute the optional processing to be applied to the product in the delivery way from the store to the delivery destination, and sends the input set information to the service provider server 1.

The deliverer terminal 4 is, for example, a smartphone or a tablet type computer, and is held by the deliverer who delivers the product ordered by the orderer from the store to the orderer. The deliverer terminal 4 receives offer information of catching a deliverer of the product, and displays the received offer information. The offer information includes a location of the store. Further, when an optional processing is to be applied to the product, the offer information includes a condition that a deliverer should have a device capable of executing a predetermined optional processing.

The deliverer terminal 4 receives an input by a deliverer (delivery candidate) as to whether to apply for the offer to a deliverer, and an input of device discrimination information of discriminating a device 5 used in the delivery by the deliverer (delivery candidate). The device 5 may automatically send the device discrimination information to a deliverer terminal 4, and the deliverer terminal 4 may automatically receive the device discrimination information from the device 5. The deliverer terminal 4 sends to the service provider server 1 application information indicating that the delivery candidate applies for the offer to the deliverer. Here, the application information includes the device discrimination information of discriminating the device 5 used in the delivery. When the applied delivery candidate is determined to be the deliverer, the deliverer terminal 4 receives from the service provider server 1 determination notification information notifying that the delivery candidate is determined to be the deliverer. The determination notification information includes a location of the store where the product is picked up, a location of the delivery destination to which the product is delivered, and an order number of identifying the order.

The device 5 is in the form of a bag that stores the product in the delivery, and is held by the deliverer. The device 5 has a space therein for accommodating the product. The deliverer places the product (for example, a cooked food) in the device 5. The deliverer moves from the store to the delivery destination designated by the orderer while holding the device 5 where the product is accommodated. The device 5 includes an instrument for applying the optional processing to the product. The instrument adjusts at least one of a temperature and a water content of the cooked food or the foodstuff. For example, the instrument includes at least one of a heater for heating the product, a humidifier for humidifying the space inside the device 5 to thereby adjust the humidity in the inside space of the device 5, a ventilator for ventilating the inside space of the device 5 to thereby adjust the humidity in the inside space of the device 5, and a ventilating window being opened and closed to thereby adjust the humidity in the inside space of the device 5. The device 5 may include a sensor for measuring at least one of a temperature and a humidity in the inside space.

For example, when the optional processing is crisping processing, the device 5 is set in such a manner that a predetermined temperature or higher and a predetermined humidity or lower are maintained in the inside space. Further, for example, when the optional processing is softening processing, the device 5 is set in such a manner that a predetermined humidity or higher is maintained in the inside space. Further, for example, when the optional processing is oil removing processing, the device 5 is set in such a manner that a predetermined temperature or higher is maintained in the inside space. The device 5 which is capable of executing the oil removing processing further includes a container for containing the cooked food or the foodstuff. The container includes a plate on which the cooked food or the foodstuff is placed, and a drip tray arranged below the plate. The plate is formed with a slit, and oil dropping from the cooked food or the foodstuff flows from the slit to the drip tray provided below. The container is made of a heat-resistant material such as a metal. The container is arranged above the heater. The heater heats the container to thus heat the cooked food or the foodstuff to let fall drops of oil from the cooked food or the foodstuff.

The deliverer terminal 4 receives from the service provider server 1 set information for the device 5 to execute the optional processing. The deliverer terminal 4 sends the received set information to the device 5. The deliverer terminal 4 and the device 5 are communicably connected to each other in a way of short-range wireless communication standard, e.g., Bluetooth (registered trademark). The deliverer terminal 4 may send the set information to the device 5 in response to an instruction of the deliverer, or may automatically send the received set information to the device 5. Alternatively, the deliverer terminal 4 may merely display the set information. In this case, the deliverer may input the set information directly to the device 5 while seeing the set information displayed on the deliverer terminal 4.

The set information includes information about at least one of a temperature and a humidity every predetermined time in a travel period from the store to the delivery destination. Further, the set information may concern at least one of a frequency and a time of executing a function of the device 5 corresponding to the processing of maintaining the state of the cooked food or the foodstuff, or the processing of changing the state of the cooked food or the foodstuff in the delivery way from the store to the delivery destination. The frequency of executing a function of the device 5 indicates, for example, an operating frequency of the ventilator or an opening frequency of the ventilation window, and the time of executing a function of the device 5 indicates, for example, an operating time of the ventilator or an opening time of the ventilation window.

The deliverer terminal 4 receives an input by the deliverer as to whether the deliverer has started moving from the store to the delivery destination, and sends to the service provider server 1 the delivery start notification information notifying that the deliverer has started moving from the store to the delivery destination. Further, the deliverer terminal 4 receives an input by the deliverer as to whether the deliverer has completed the delivery, and sends to the service provider server 1 the delivery completion notification information notifying that the deliverer has completed the delivery.

In the present embodiment, the service provider server 1 sends the set information to the device 5 via the deliverer terminal 4. However, the present disclosure is not particularly limited to this embodiment. When the service provider server 1 and the device 5 are communicably connected to each other via the network 6, the service provider server 1 may send the set information directly to the device 5.

Further, the delivery system shown in FIG. 1 includes one orderer terminal 2, one store terminal 3, one deliverer terminal 4, and one device 5. However, the present disclosure is not particularly limited to this embodiment. The delivery system may include a plurality of orderer terminals 2, a plurality of store terminals 3, a plurality of deliverer terminals 4, and a plurality of devices 5.

Figure 2:
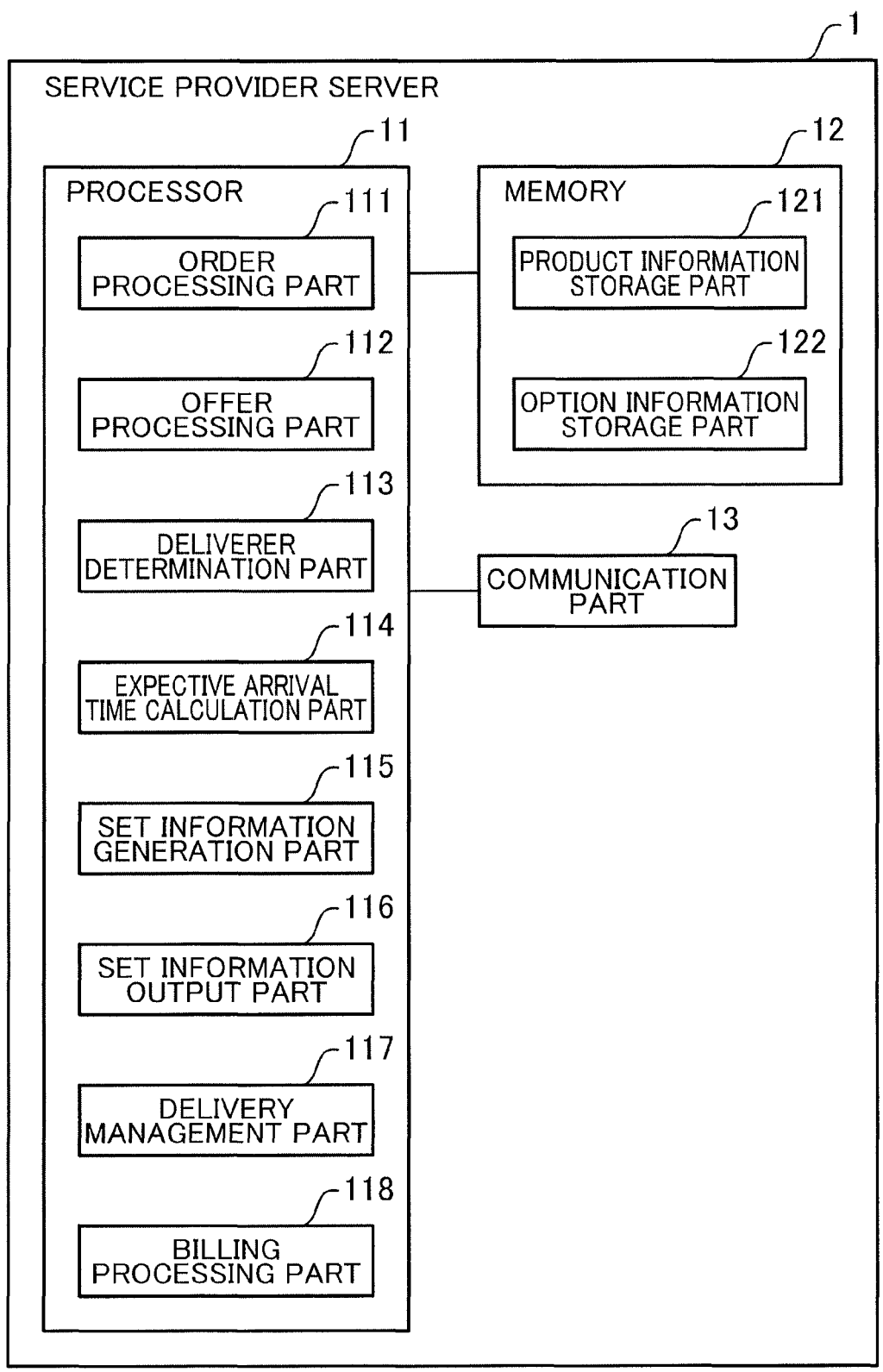
FIG. 2 is a block diagram showing a configuration of a service provider server according to the present embodiment.

FIG. 2 is a block diagram showing a configuration of the service provider server 1 according to the present embodiment.

The service provider server 1 includes a processor 11, a memory 12, and a communication part 13.

The processor 11 is, for example, a CPU (Central Processing Unit). An order processing part 111, an offer processing part 112, a deliverer determination part 113, an expective arrival time calculation part 114, a set information generation part 115, a set information output part 116, a delivery management part 117, and a billing processing part 118 are implemented by the processor 11.

The memory 12 is, for example, a storage device capable of storing a variety of information, e.g., RAM (Random Access Memory), HDD (Hard Disk Drive), SSD (Solid State Drive), or Flash Memory. A product information storage part 121 and an option information storage part 122 are implemented by the memory 12.

The product information storage part 121 stores in advance product information which makes a store, a product provided by the store, and a type of optional processing applicable to the product be associated with one another.

The order processing part 111 generates a product order screen for receiving an order of a product on the basis of the product information, and sends the generated product order screen to the orderer terminal 2 via the communication part 13.

The communication part 13 receives from the orderer terminal 2 order information concerning a product provided by the store, and a type of optional processing to be applied to the product. The order processing part 111 sends the order information to the store terminal 3 via the communication part 13. The communication part 13 receives a product ready time sent from the store terminal 3.

The order processing part 111 sets a fee for the product. Further, the order processing part 111 sets a fee for the optional processing. Additionally, the order processing part 111 sets a fee for the delivery (i.e., a delivery commission). A total amount of the fee for the product, the fee for the optional processing, and the fee for the delivery are the amount charged to the orderer.

The offer processing part 112 generates offer information of catching a deliverer who delivers the product on the basis of the ready time received by the communication part 13, and sends the generated offer information to a deliverer terminal 4 via the communication part 13. The communication part 13 sends the offer information of catching a deliverer who delivers the product to a deliverer terminal 4 of a delivery candidate. The offer processing part 112 specifies a delivery candidate who can arrive at the store by a certain time before the ready time, and sends the offer information to the deliverer terminal 4 of the specified delivery candidate. The certain time is, for example, five minutes. The offer information includes a location of the store and an offer condition that the deliverer should have a device capable of executing the optional processing.

There is not always a single delivery candidate who can arrive at the store by a certain time before the ready time. The offer processing part 112 may specify at least one delivery candidate who can arrive at the store by a certain time before the ready time, and send the offer information to a deliverer terminal 4 of each of the at least one specified delivery candidate.

Further, the offer processing part 112 may send the offer information of catching a deliverer who can arrive by a certain time before the ready time to all the deliverer terminals 4 of a plurality of delivery candidates without specifying at least one deliverer who can arrive by the certain time before the ready time. The delivery candidate may see the offer information displayed on the deliverer terminal 4, and apply for the offer when judging himself/herself as being able to arrive by the certain time before the ready time.

Further, the offer processing part 112 may specify at least one delivery candidate located within a predetermined distance from the store, and send the offer information to a deliverer terminal 4 of the at least one specified delivery candidate.

The communication part 13 receives application information including device discrimination information of discriminating a device held by a delivery candidate from the deliverer terminal 4 of the delivery candidate.

The option information storage part 122 stores in advance option information which makes a type of optional processing and discrimination information of devices capable of executing the optional processing be associated with each other.

FIG. 3 is a table showing exemplary option information to be stored in an option information storage part 122 according to the present embodiment.

As shown in FIG. 3, "Oil removing processing" is associated with "Device A" which is a device capable of executing the oil removing processing. "Crisping processing" is associated with "Device B" which is a device capable of executing the crisping processing, and "Softening processing" is associated with "Device C" which is a device capable of executing the softening processing. The device discrimination information may be either a name of the device, a product number of the device, or a model number of the device.

The deliverer determination part 113 determines a deliverer who has a device 5 capable of executing the optional processing, and delivers the product from the store to a delivery destination designated by the orderer. The deliverer determination part 113 judges whether the device is capable of executing the optional processing on the basis of the device discrimination information included in the application information, and determines the delivery candidate to be the deliverer when judging that the device is capable of executing the optional processing.

Specifically, the deliverer determination part 113 judges whether the device discrimination information included in the application information coincides with the device discrimination information associated with the type of the optional processing in the order information by referring to the option information stored in the option information storage part 122. When the device discrimination information included in the application information coincides with the device discrimination information associated with the type of optional processing in the order information, the deliverer determination part 113 judges that the device is capable of executing the optional processing. On the other hand, when the device discrimination information included in the application information does not coincide with the device discrimination information associated with the type of the optional processing in the order information, the deliverer determination part 113 judges that the device is not capable of executing the optional processing.

When receiving application information from a plurality of deliverer terminals 4, the deliverer determination part 113 determines that a delivery candidate who has a device capable of executing the optional processing and has sent the application information first is the deliverer. When receiving application information from a plurality of deliverer terminals 4, the deliverer determination part 113 may determine that a delivery candidate who has a device capable of executing the optional processing and is located closest to the store is the deliverer. When receiving application information from a plurality of deliverer terminals 4, the deliverer determination part 113 may determine that a delivery candidate who has a device capable of executing the optional processing and has received the highest evaluation from orderers is the deliverer.

The deliverer determination part 113 sends determination notification information notifying that the delivery candidate is determined to be the deliverer to a deliverer terminal 4 of the determined deliverer via the communication part 13.

The memory 12 may store in advance deliverer information which makes a deliverer and a device held by the deliverer be associated with each other. The offer processing part 112 may specify a delivery candidate who can arrive by a certain time before the ready time and has a device capable of executing the optional processing, and send the offer information to the deliverer terminal 4 of the specified deliverer. In this case, the delivery candidate who has returned the application information undoubtedly has a device capable of executing the optional processing. This eliminates the need to verify whether the device is capable of executing the optional processing.

The expective arrival time calculation part 114 calculates an expective arrival time when the deliverer determined by the deliverer determination part 113 is expected to arrive at the delivery destination. The expective arrival time calculation part 114 calculates the expective arrival time when the deliverer is expected to arrive at the delivery destination before the deliverer departs from the store to the delivery destination. The expective arrival time calculation part 114 calculates the expective arrival time by adding to the product ready time a predetermined preparation time and a travel time of the deliverer from the store to the delivery destination. The predetermined preparation time is, for example, five minutes. The travel time of the deliverer from the store to the delivery destination is calculated by dividing a distance from the store to the delivery destination by an average speed of transport means (e.g., a bicycle or a bike) used by the deliverer. The transport means used by the deliverer is included in the deliverer information. A predetermined speed corresponding to the transport means is stored in advance in the memory 22 as an average speed of the transport means. The average speed of the transport means may be the past average travel speed of the deliverer.

The set information generation part 115 sends to the store terminal 3 via the communication part 13 set request information of requesting an input of set information causing the device 5 to execute the optional processing to be applied to the product in the delivery way from the store to the delivery destination.

The communication part 13 receives the set information having been input and sent on the basis of the order information by the store terminal 3.

The set information output part 116 sends to the deliverer terminal 4 via the communication part 13 set information causing the device 5 to execute the optional processing to be applied to the product in the delivery way from the store to the delivery destination. The communication part 13 sends the set information for the device 5 to the deliverer terminal 4.

The communication part 13 receives from the deliverer terminal 4 delivery start notification information notifying that the deliverer has started moving from the store to the delivery destination.

The delivery management part 117 sends to the orderer terminal 2 via the communication part 13 delivery progress information indicating a current location of the deliverer.

The communication part 13 receives from the deliverer terminal 4 delivery completion notification information notifying that the deliverer has completed the delivery.

When the delivery completion notification information is received, the billing processing part 118 determines an amount to be collected from the orderer. The billing processing part 118 acquires the arrival time when the deliverer has actually arrived at the delivery destination. The delivery completion notification information sent from the deliverer terminal 4 may include the arrival time. The billing processing part 118 acquires the arrival time included in the delivery completion notification information. In the case that the communication part 13 periodically receives a current location of the deliverer terminal 4, the billing processing part 118 may determine that a time at which the current location of the deliverer terminal 4 coincides with the delivery destination is the arrival time.

The billing processing part 118 refuses a payment of the fee for the optional processing from the orderer when a difference between the arrival time and the expective arrival time is not smaller than a predetermined time period. The predetermined time period is, for example, five minutes. When the arrival time is the predetermined time or more earlier than the expective arrival time, the optional processing is liable to be still incomplete. When the arrival time is the predetermined time or more later than the expective arrival time, a certain period of time is liable to have elapsed after the completion of the optional processing. In these cases, the payment of the fee for the optional processing is refused because there is a likelihood that the expected result of the optional processing cannot be obtained.

Hereinafter, a delivery process by the delivery system according to the embodiment of the present disclosure will be described.

Figure 4:
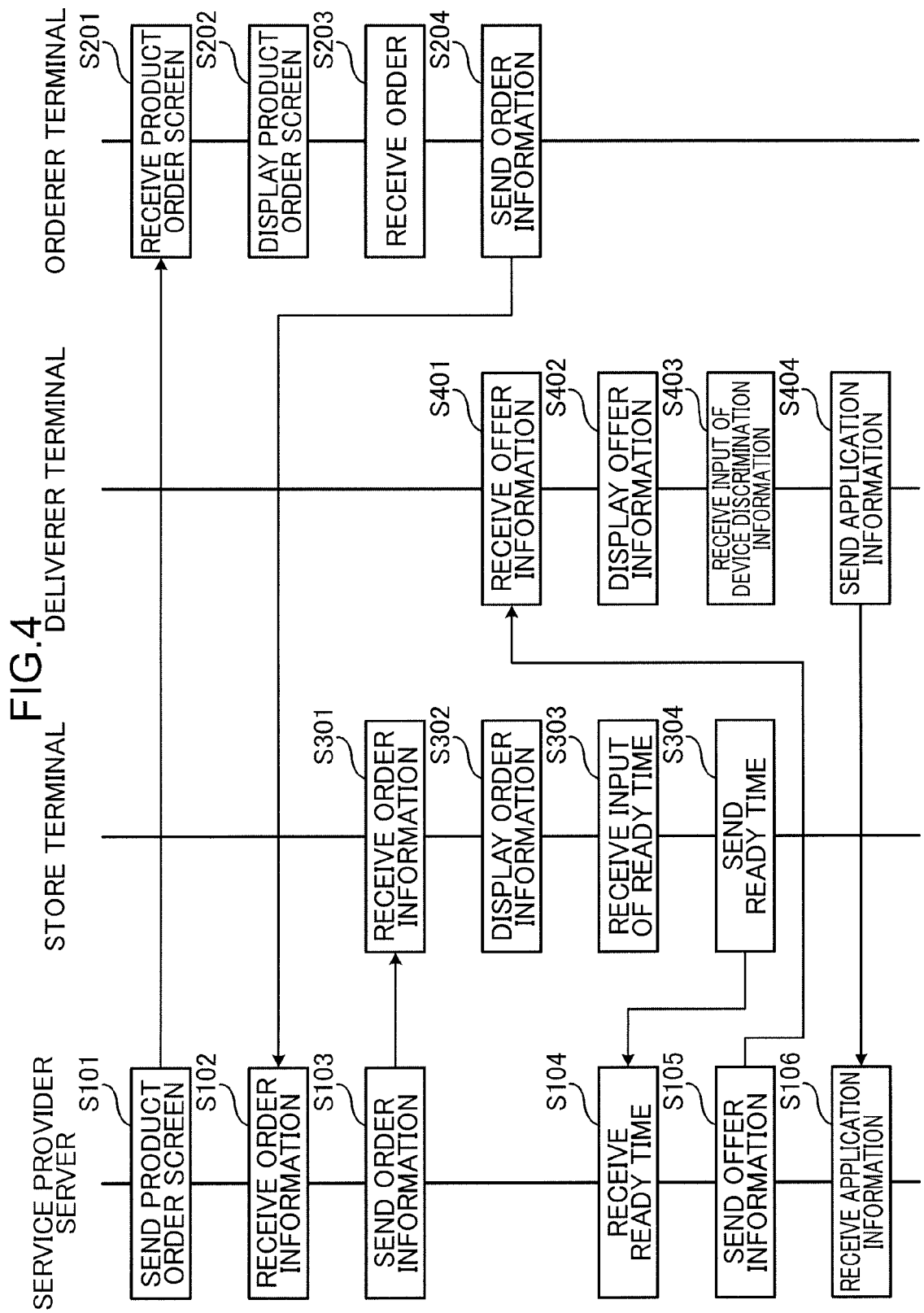
FIG. 4 is a first sequence diagram showing an exemplary delivery process by the delivery system according to the embodiment of the present disclosure.
Figure 5:
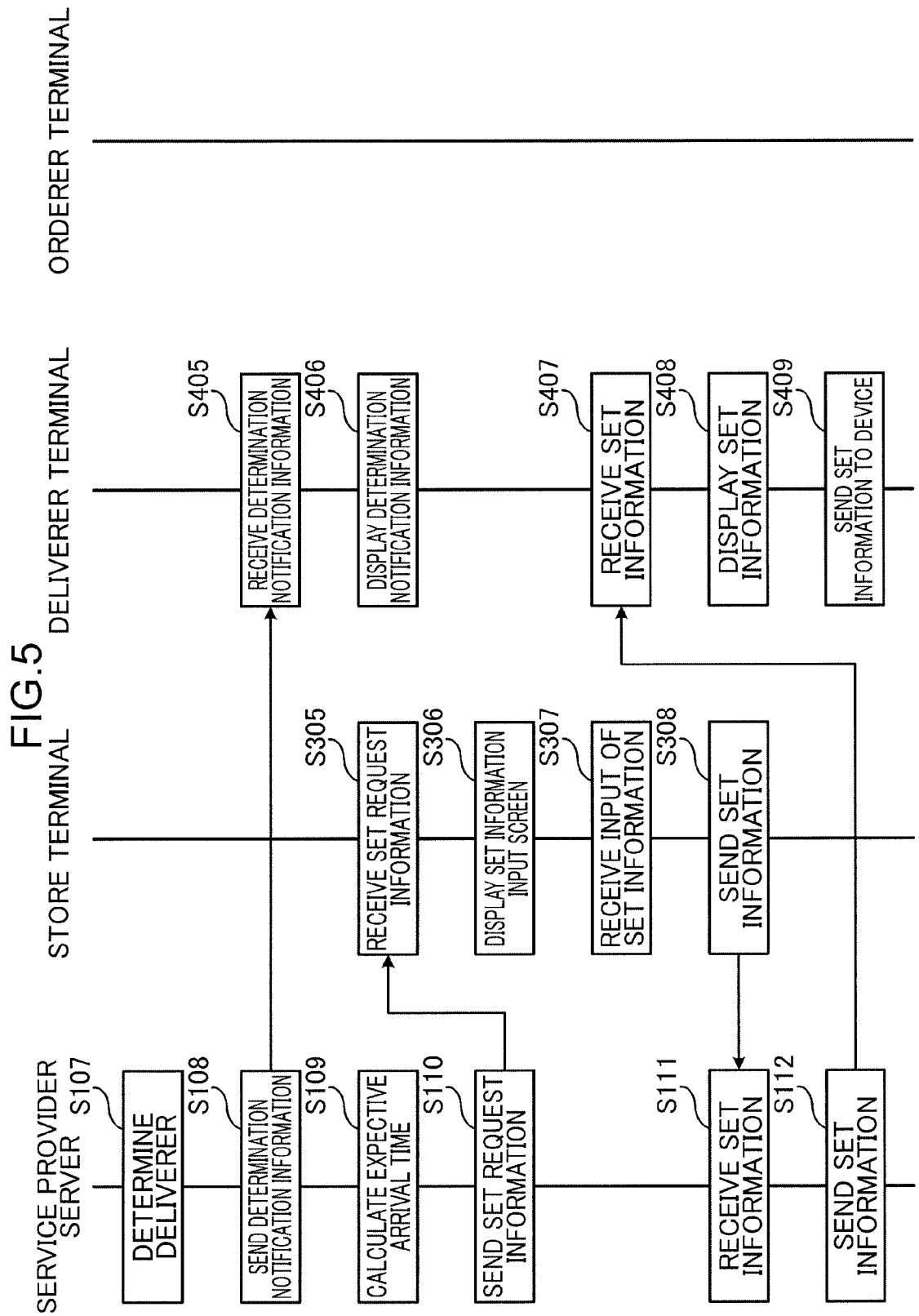
FIG. 5 is a second sequence diagram showing an exemplary delivery process by the delivery system according to the embodiment of the present disclosure.
Figure 6:
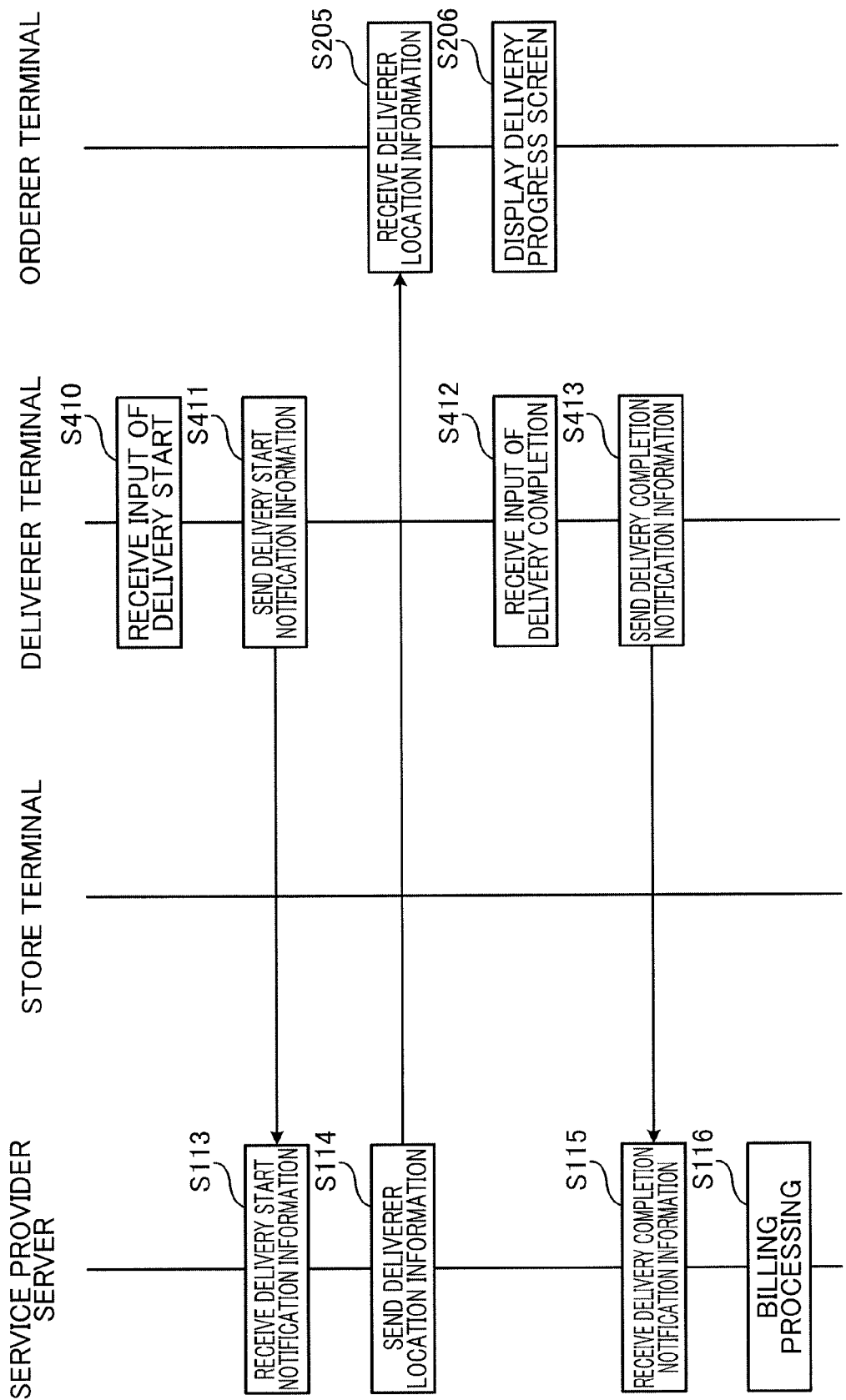
FIG. 6 is a third sequence diagram showing an exemplary delivery process by the delivery system according to the embodiment of the present disclosure.

FIG. 4 is a first sequence diagram showing an exemplary delivery process by the delivery system according to the embodiment of the present disclosure. FIG. 5 is a second sequence diagram showing an exemplary delivery process by the delivery system according to the embodiment of the present disclosure. FIG. 6 is a third sequence diagram showing an exemplary delivery process by the delivery system according to the embodiment of the present disclosure.

First, in Step S101, the order processing part 111 in the service provider server 1 generates a product order screen for receiving an order of the product on the basis of product information stored in the product information storage part 121, and sends the generated product order screen to the orderer terminal 2. The order processing part 111 may receive in advance from the orderer terminal 2 location information of the delivery destination designated by the orderer. The order processing part 111 may present to the orderer a product in a store within a predetermined distance from the delivery destination on the basis of the location information of the delivery destination.

Thereafter, in Step S201, the orderer terminal 2 receives the product order screen sent from the service provider server 1.

Subsequently, in Step S202, the orderer terminal 2 displays the product order screen.

Subsequently, in Step S203, the orderer terminal 2 receives the order of the product on the product order screen.

Figure 7:
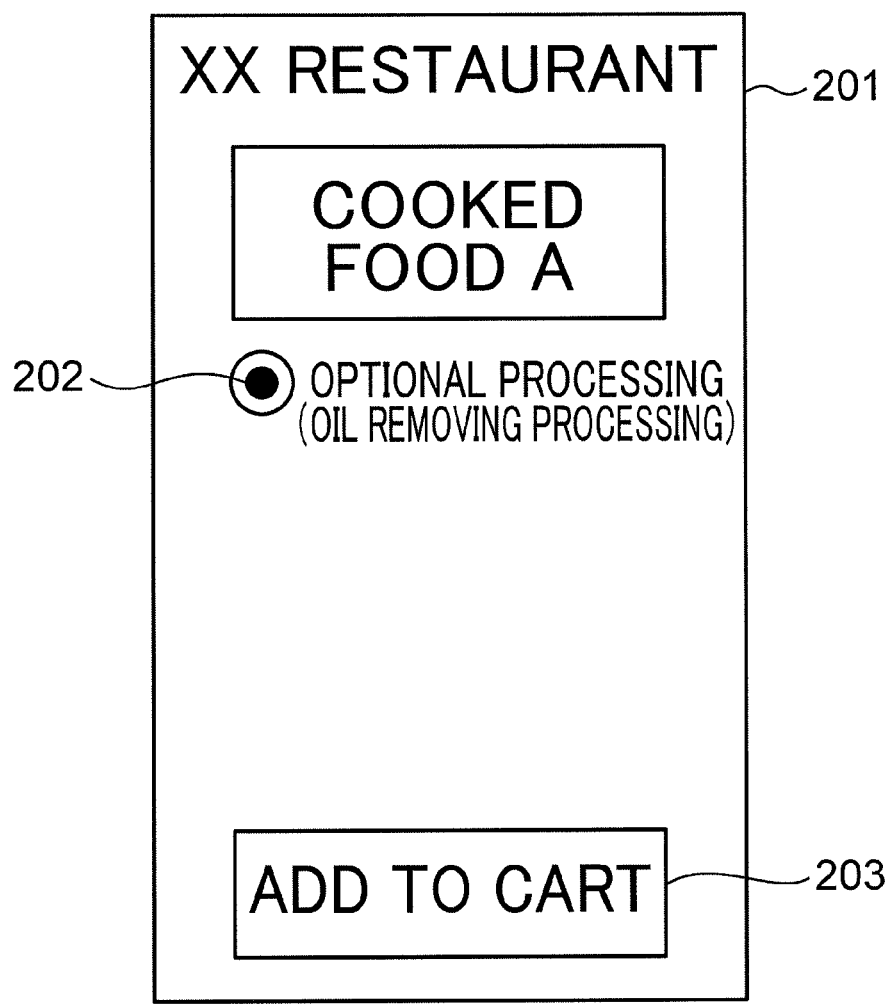
FIG. 7 is an illustration showing an exemplary product order screen to be displayed for selection of a product in the present embodiment.

FIG. 7 is an illustration showing an exemplary product order screen to be displayed for selection of a product in the present embodiment.

First, on the product order screen, the orderer selects, among a plurality of stores, a store where the orderer wishes to place an order of a product, and selects a desired product among a plurality of products provided in the selected store. The product order screen 201 shown in FIG. 7 displays a name of the store (i.e., XX Restaurant) selected by the orderer, a name of the product (i.e., Cooked food A) selected by the orderer, and a name of the optional processing (i.e., Oil removing processing) applicable to the product.

The product order screen 201 includes a checkbox 202 for receiving an instruction from the orderer as to whether to apply optional processing to the product. The orderer instructs whether or not to apply optional processing to the product. When optional processing is applied to the product, the orderer touches the checkbox 202. When optional processing is not applied to the product, the orderer does not touch the checkbox 202.

Further, the product order screen 201 includes a button 203 for adding the displayed product to a virtual cart. The button 203 is touched to thereby add the displayed product to the virtual cart.

By referring again to FIG. 4, next, in Step S204, the orderer terminal 2 sends to the service provider server 1 order information concerning the product provided by the store, and the type of the optional processing to be applied to the product.

Figure 8:
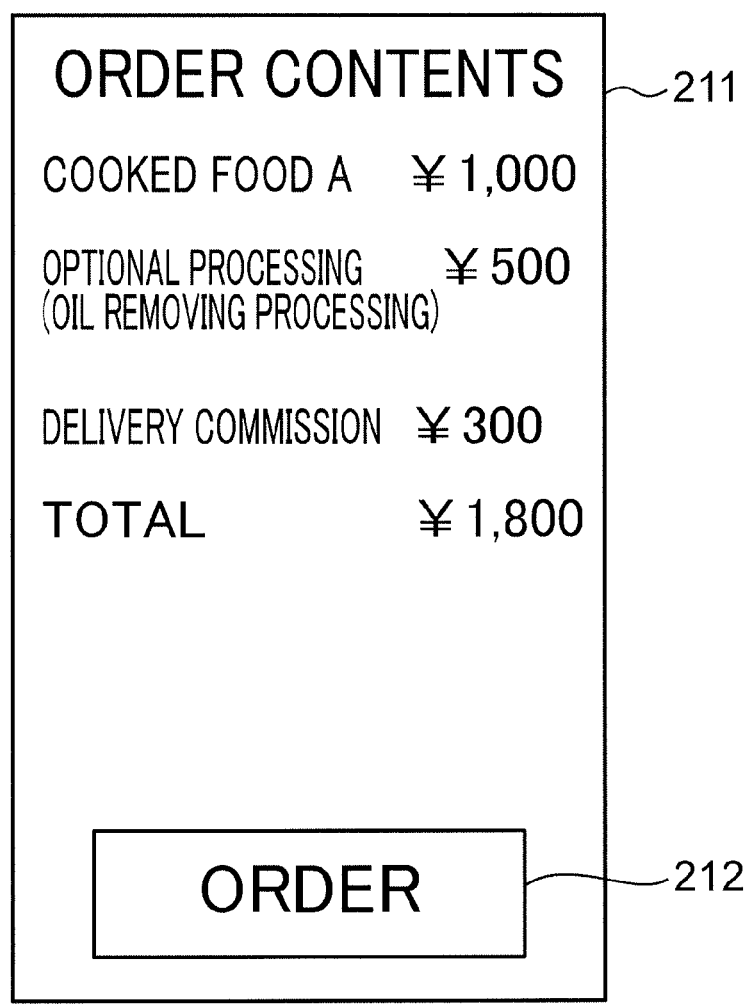
FIG. 8 is an illustration showing an exemplary product order screen to be displayed for determination of an order of a product in the present embodiment.

FIG. 8 is an illustration showing an exemplary product order screen to be displayed for determination of an order of a product in the present embodiment.

The product order screen 211 shown in FIG. 8 displays the product selected by the orderer (the product added to the virtual cart), a fee for the product, optional processing selected by the orderer, a fee for the optional processing, a delivery commission (a fee for the delivery), and a total amount.

Further, the product order screen 211 includes a button 212 for determining the displayed order contents. When the button 212 is touched, the orderer terminal 2 generates order information concerning the product selected by the orderer, and the type of the optional processing to be applied to the product, and sends the generated order information to the service provider server 1.

By referring again to FIG. 4, next, in Step S102, the communication part 13 in the service provider server 1 receives the order information sent from the orderer terminal 2.

Subsequently, in Step S103, the order processing part 111 sends the order information to the store terminal 3.

Subsequently, in Step S301, the store terminal 3 receives the order information sent from the service provider server 1.

Thereafter, in Step S302, the store terminal 3 displays the received order information.

Thereafter, in Step S303, the store terminal 3 receives an input of a product ready time by an employee of the store (i.e., a product provider).

Subsequently, in Step S304, the store terminal 3 sends the input ready time to the service provider server 1.

Figure 9:
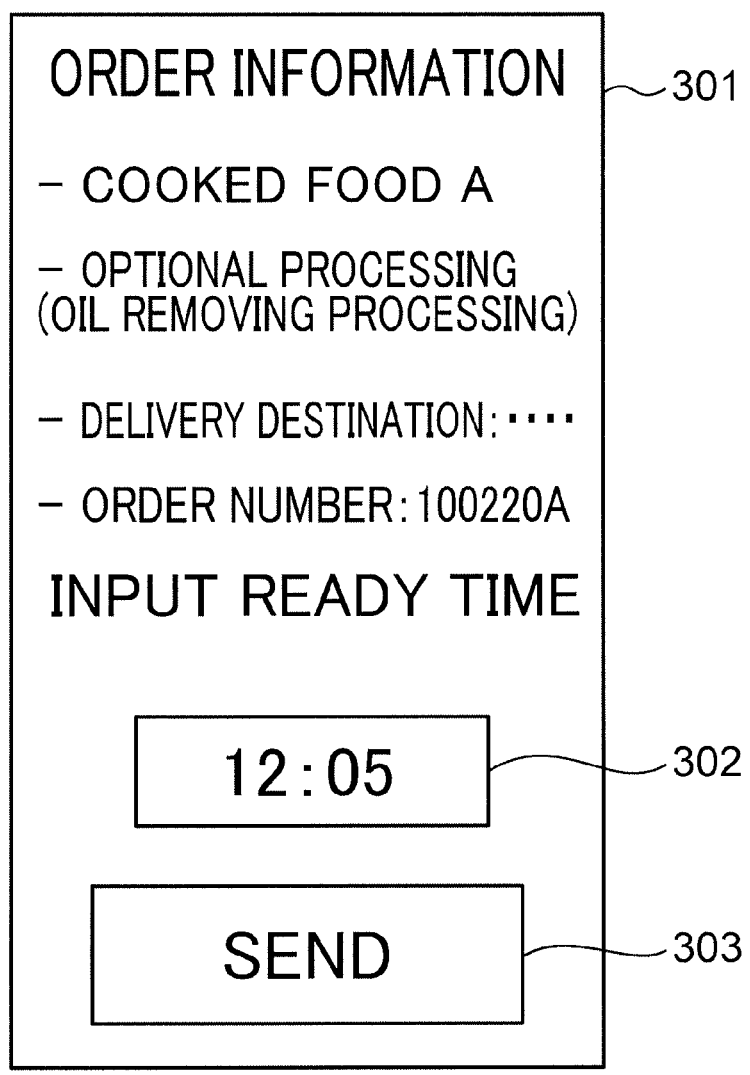
FIG. 9 is an illustration showing an exemplary order information screen to be displayed on a store terminal according to the present embodiment.

FIG. 9 is an illustration showing an exemplary order information screen to be displayed on the store terminal 3 according to the present embodiment.

The order information screen 301 shown in FIG. 9 displays the name of the ordered product (i.e., Cooked food A), the type of the optional processing (i.e., Oil removing processing), a location (i.e., an address) of the delivery destination, and an order number for identifying the order. In the case that the product is a cooked food or a foodstuff, the employee of the store sees the order information displayed on the store terminal 3, and prepares the ordered cooked food or foodstuff.

Further, the order information screen 301 includes an input field 302 for receiving an input of a product ready time, and a send button 303 for sending the input ready time. The product ready time is an expective time when the preparation of the product is expected to be completed. The employee of the store inputs the product ready time in the input field 302. Thereafter, when the send button 303 is touched, the store terminal 3 sends to the service provider server 1 the ready time input by the employee of the store.

By referring again to FIG. 4, next, in Step S104, the communication part 13 of the service provider server 1 receives the ready time sent from the store terminal 3.

Subsequently, in Step S105, the offer processing part 112 generates offer information of catching a deliverer who delivers the product on the basis of the ready time received by the communication part 13, and sends the generated offer information to a deliverer terminal 4. The memory 12 stores in advance deliverer information concerning a deliverer. A deliverer is not always available to deliver a product. Accordingly, when available to deliver a product, the deliverer notifies the service provider server 1 via the deliverer terminal 4 of being a delivery candidate available to deliver a product. The offer processing part 112 sends offer information to a deliverer terminal 4 of a delivery candidate who can arrive at the store by a certain time before the ready time among the delivery candidates available to deliver the product. The service provider server 1 periodically acquires current locations of the respective deliverer terminals 4 of the delivery candidates, and stores the locations in the memory 12. The offer processing part 112 specifies at least one deliverer terminal 4 who can arrive by a certain time before the ready time on the basis of the location of the store and the respective current locations of the deliverer terminals 4, and sends the offer information to the at least one specified deliverer terminal 4.

Subsequently, in Step S401, the deliverer terminal 4 receives the offer information sent from the service provider server 1.

Subsequently, in Step S402, the deliverer terminal 4 displays the received offer information.

Thereafter, in Step S403, the deliverer terminal 4 receives an input of device discrimination information by a delivery candidate. The input device discrimination information concerns a device used by the delivery candidate in the delivery.

Thereafter, in Step S404, the deliverer terminal 4 sends to the service provider server 1 the application information including the input device discrimination information.

Figure 10:
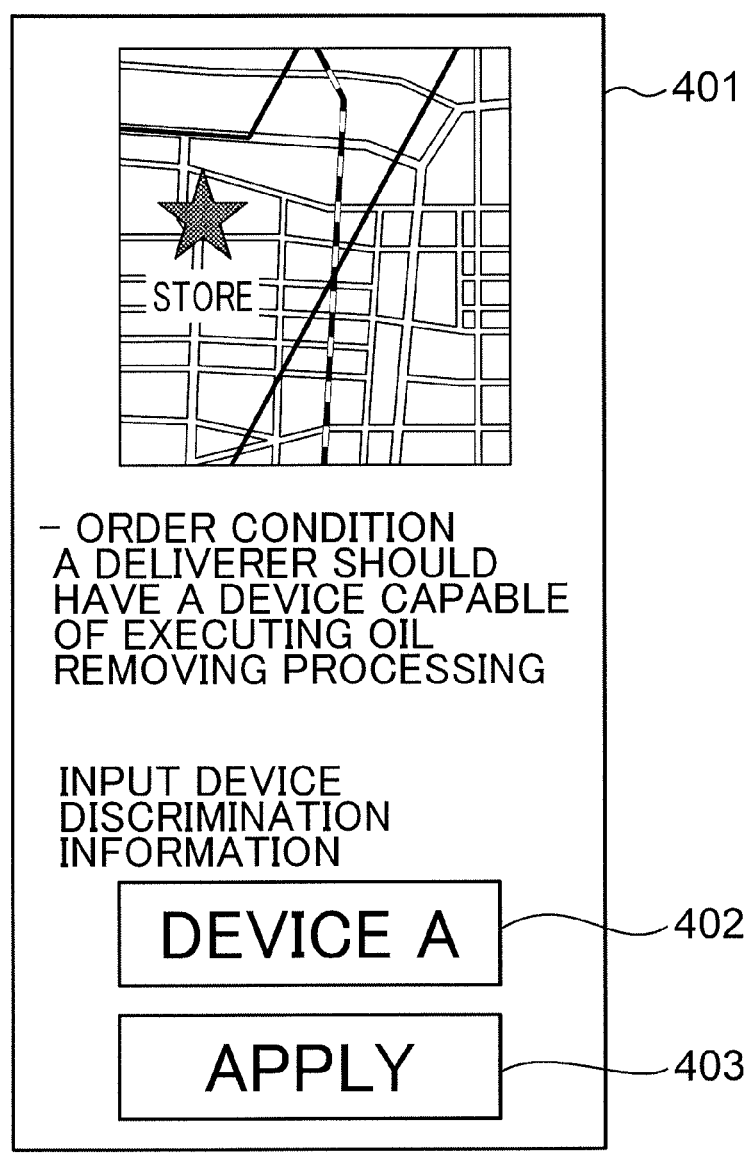
FIG. 10 is an illustration showing an exemplary offer information screen to be displayed on a deliverer terminal in the present embodiment.

FIG. 10 is an illustration showing an exemplary offer information screen to be displayed on a deliverer terminal 4 in the present embodiment.

The offer information screen 401 shown in FIG. 10 displays offer information concerning the location of the store and the offer condition. The location of the store is shown on a map. An icon indicative of the location of the store is displayed on the map. The offer condition represents a condition to be satisfied by a delivery candidate in the application, and indicates what kind of device a deliverer should have. FIG. 10 shows the offer condition that the deliverer should have a device capable of executing the oil removing processing. The offer information may include the location of the delivery destination, and the offer information screen 401 may display on the map the location of the delivery destination together with the location of the store. Further, the offer information screen 401 may display on the map a current location of the deliverer terminal 4 together with the location of the store.

Further, the offer information screen 401 includes an input field 402 for receiving an input by a delivery candidate of device discrimination information of discriminating a device 5 used in the delivery, and an application button 403 for applying for the offer to the deliverer. When applying for the offer to the deliverer, the delivery candidate inputs the device discrimination information, and touches the application button 403. The delivery candidate inputs in the input field 402 the device discrimination information of discriminating the device 5 used by himself/herself in the delivery. When the application button 403 is touched, the deliverer terminal 4 sends to the service provider server 1 the application information including the device discrimination information input by the delivery candidate.

In the present embodiment, the deliverer terminal 4 receives an input of the device discrimination information by a delivery candidate. However, the present disclosure is not particularly limited to this embodiment. A deliverer terminal 4 may acquire device discrimination information encoded in a two-dimensional code attached on a surface of the device by reading the two-dimensional code.

Further, the offer information screen 401 may include an application refusal button not to apply for the offer to the deliverer. When the application refusal button is touched, the deliverer terminal 4 sends to the service provider server 1 application refusal information indicating that the delivery candidate has refused to apply for. When the application refusal information is received, the flow returns to Step S105, and the offer processing part 112 specifies another delivery candidate. Further, when the application information has not been received after a lapse of a predetermined time from the submission of the offer information, the flow may return to Step S105, and the offer processing part 112 may specify another delivery candidate.

By referring again to FIG. 4, next, in Step S106, the communication part 13 of the service provider server 1 receives the application information sent from the deliverer terminal 4.

Subsequently, in Step S107, the deliverer determination part 113 determines, among the applied delivery candidates, a deliverer who has a device 5 capable of executing the ordered optional processing and delivers the product from the store to the delivery destination designated by the orderer.

When a plurality of delivery candidates has applied for the offer, the deliverer determination part 113 specifies a delivery candidate who has applied first among the delivery candidates. Subsequently, the deliverer determination part 113 judges whether the device discrimination information included in the application information of the specified delivery candidate coincides with the device discrimination information associated with the type of the optional processing in the order information. When the device discrimination information included in the application information coincides with the device discrimination information associated with the type of optional processing in the order information, the deliverer determination part 113 determines that the delivery candidate who has applied first is the deliverer. On the other hand, when the device discrimination information included in the application information does not coincide with the device discrimination information associated with the type of optional processing in the order information, the deliverer determination part 113 specifies the second delivery candidate to apply for, and executes the subsequent judgement processing on the device discrimination information. Thereafter, the deliverer determination part 113 specifies the delivery candidates one after another in the order of application arrivals until a deliverer is determined, and executes the subsequent judgement processing on the respective device discrimination information.

The deliverer determination part 113 may specify a delivery candidate who is located closest to the store among the delivery candidates. Alternatively, the deliverer determination part 113 may specify a delivery candidate who has received the highest orderer evaluation among the delivery candidates.

When a deliverer is not determined among the delivery candidates, i.e., when all the delivery candidates fail to have the device capable of executing the optional processing, the offer processing part 112 may re-send the offer information to a deliverer terminal 4.

Subsequently, in Step S108, the deliverer determination part 113 sends determination notification information notifying that the delivery candidate is determined to be the deliverer to a deliverer terminal 4 of the determined deliverer. The deliverer determination part 113 may send information notifying that the delivery candidate is not determined to be the deliverer to a deliverer terminal 4 of a delivery candidate who has not been determined to be the deliverer.

Subsequently, in Step S405, the deliverer terminal 4 receives determination notification information sent from the service provider server 1.

Thereafter, in Step S406, the deliverer terminal 4 displays the received determination notification information.

Figure 11:
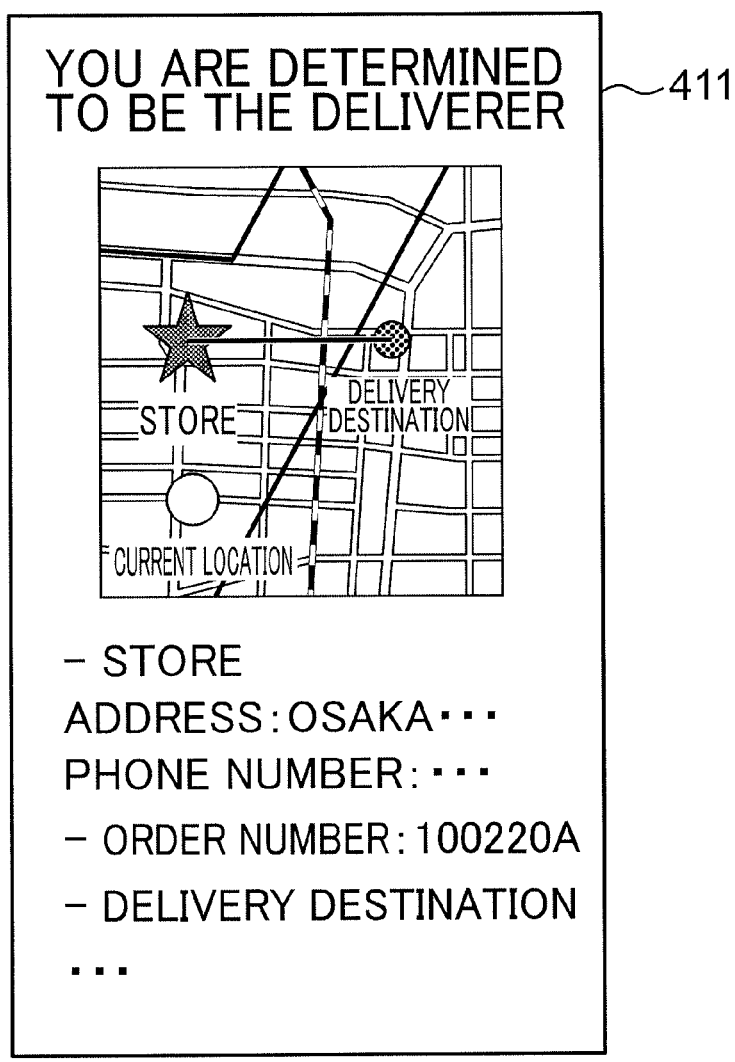
FIG. 11 is an illustration showing an exemplary determination notification information screen to be displayed on the deliverer terminal in the present embodiment.

FIG. 11 is an illustration showing an exemplary determination notification information screen to be displayed on the deliverer terminal 4 in the present embodiment.

The determination notification information screen 411 shown in FIG. 11 displays a phrase notifying that the delivery candidate is determined to be the deliverer, a map, the location of the store, the location of the delivery destination, and the order number for identifying the order. On the map, the icon indicative of the location of the store, an icon indicative of the location of the delivery destination, and an icon indicative of the current location of the deliverer are displayed. The deliverer who has received the determination notification information moves toward the store displayed on the determination notification information screen 411.

By referring again to FIG. 5, next, in Step S109, the expective arrival time calculation part 114 calculates an expective arrival time when the deliverer specified by the deliverer determination part 113 is expected to arrive at the delivery destination.

Subsequently, in Step S110, the set information generation part 115 sends to the store terminal 3 set request information of requesting an input of set information causing the device 5 to execute the optional processing to be applied to the product in the delivery way from the store to the delivery destination. The set request information includes the expective arrival time calculated by the expective arrival time calculation part 114.

Thereafter, in Step S305, the store terminal 3 receives the set request information sent from the service provider server 1.

Thereafter, in Step S306, the store terminal 3 displays a set information input screen for receiving an input of the set information causing the device 5 to execute the optional processing.

Thereafter, in Step S307, the store terminal 3 receives an input of the set information by the employee of the store on the set information input screen.

Subsequently, in Step S308, the store terminal 3 sends the input set information to the service provider server 1.

Figure 12:
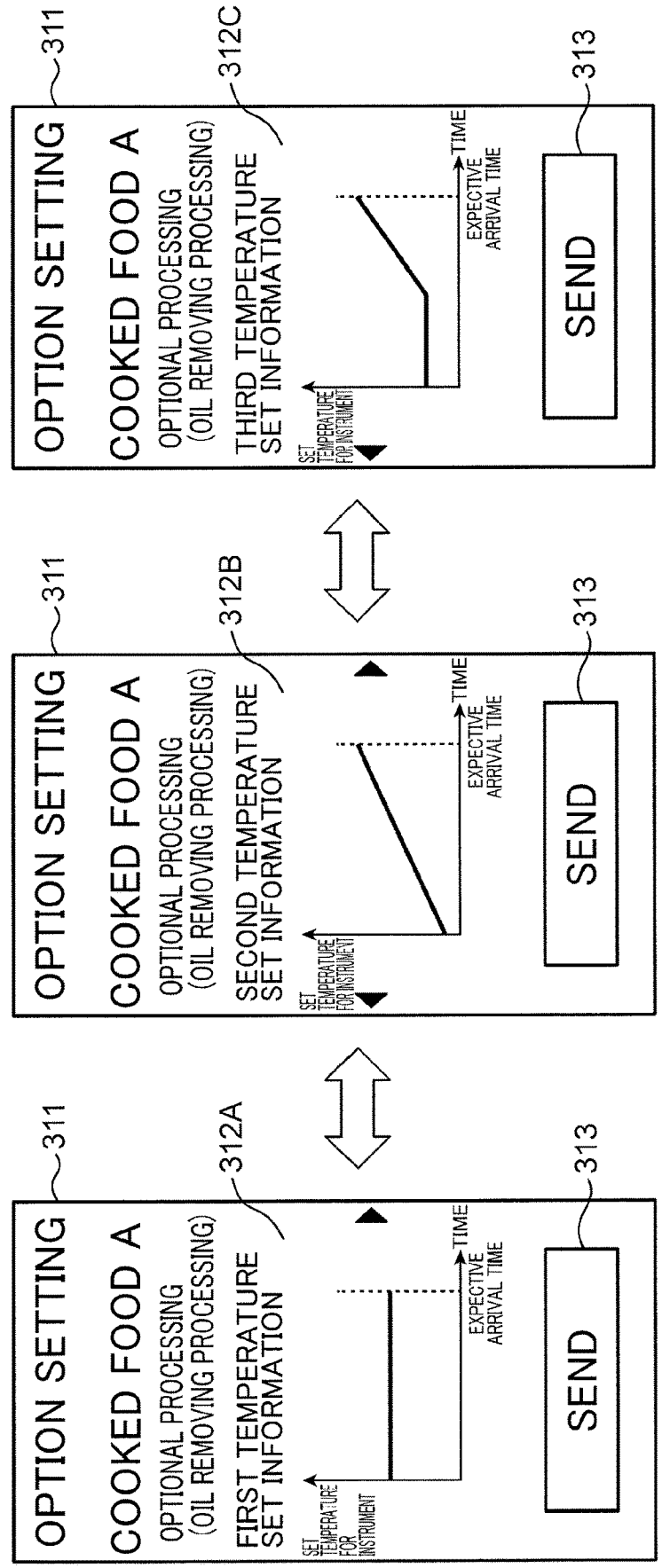
FIG. 12 is an illustration showing an exemplary set information input screen to be displayed on the store terminal when a type of optional processing is oil removing processing in the present embodiment.

FIG. 12 is an illustration showing an exemplary set information input screen to be displayed on the store terminal 3 when a type of optional processing is the oil removing processing in the present embodiment.

The set information input screen 311 shown in FIG. 12 displays the name of the product (i.e., Cooked food A), the type of the optional processing (i.e., Oil removing processing), and the set information (i.e., First temperature set information, Second temperature set information, and Third temperature set information). When the type of the optional processing is the oil removing processing, the set information indicates a temperature every predetermined time set to an instrument (i.e., a heater) included in the device 5 in the travel period from the expective departure time from the store to the expective arrival time at the delivery destination. The expective departure time is a time obtained by adding a predetermined preparation time (for example, five minutes) to the ready time.

The set information includes first temperature set information 312A, second temperature set information 312B, and third temperature set information 312C. On the set information input screen 311, an image showing the first temperature set information 312A is swiped to the left to thereby display an image showing the second temperature set information 312B. Further, the image showing the second temperature set information 312B is swiped to the left to thereby display an image showing the third temperature set information 312C.

According to the first temperature set information 312A, a set temperature for an instrument included in the device 5 is controlled to be maintained at a predetermined degree in the travel period from the expective departure time from the store to the expective arrival time at the delivery destination. According to the second temperature set information 312B, a set temperature for the instrument included in the device 5 is controlled to gradually increase in the travel period from the expective departure time from the store to the expective arrival time at the delivery destination. According to the third temperature set information 312C, the set temperature for the instrument included in the device 5 is controlled to be maintained at a certain degree in a first travel period from the expective departure time from the store to a midpoint passing time, and the set temperature for the instrument included in the device 5 is controlled to gradually increase in a second travel period from the midpoint passing time to the expective arrival time at the delivery destination.

Further, the set information input screen 311 includes a send button 313 for sending the input set information. The employee of the store inputs the set information causing the device to execute the optional processing. In the present embodiment, the employee of the store selects one of the first temperature set information, the second temperature set information, and the third temperature set information.

When the send button 313 is touched, the store terminal 3 sends to the service provider server 1 the set information input by the employee of the store.

Figure 13:
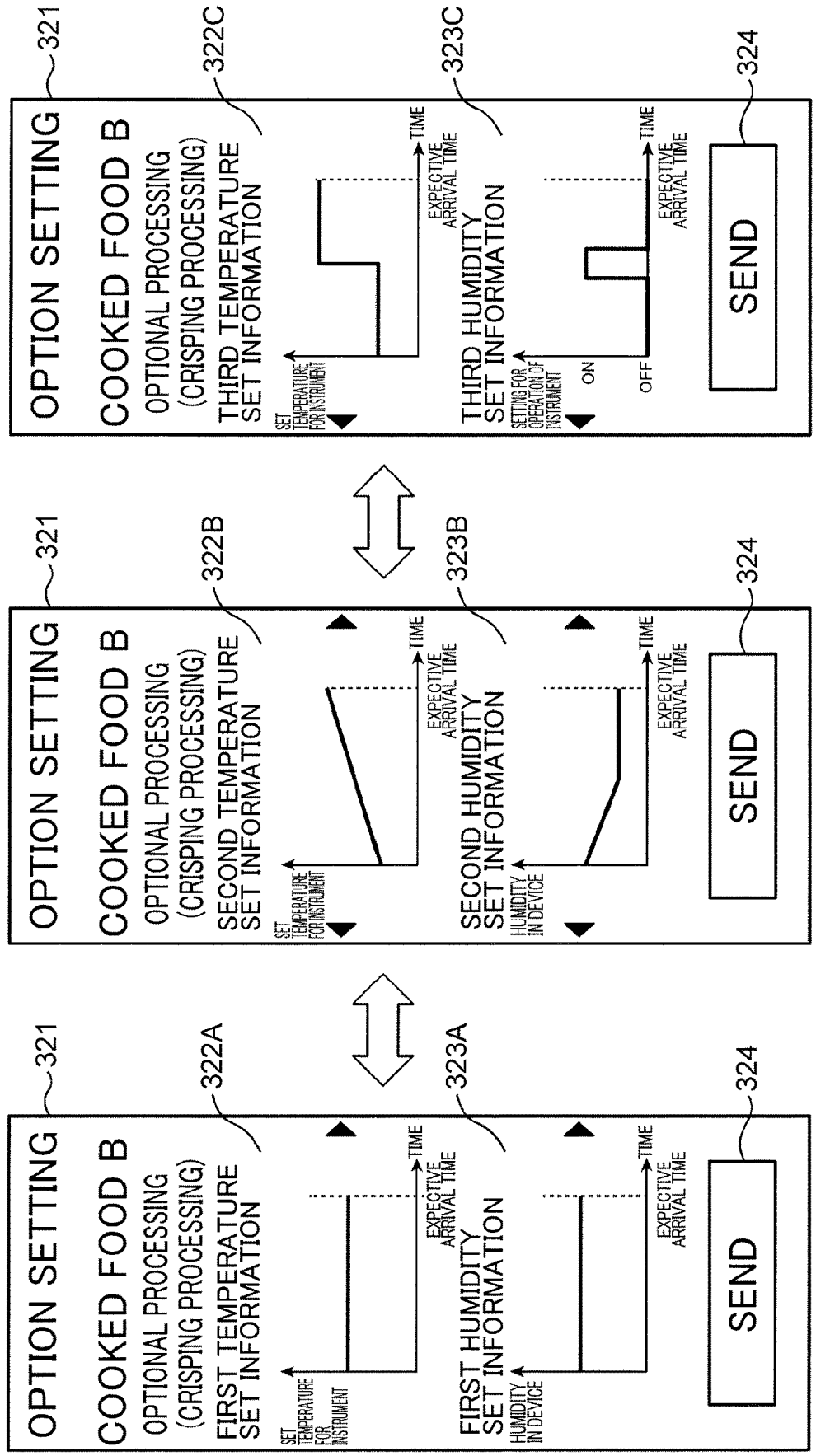
FIG. 13 is an illustration showing an exemplary set information input screen to be displayed on the store terminal when a type of optional processing is crisping processing in the present embodiment.

FIG. 13 is an illustration showing an exemplary set information input screen to be displayed on the store terminal 3 when a type of optional processing is the crisping processing in the present embodiment.

The set information input screen 321 shown in FIG. 13 displays a name of the product (i.e., Cooked food B), a type of optional processing (i.e., Crisping processing), and set information (i.e., First temperature set information, Second temperature set information, Third temperature set information, First humidity set information, Second humidity set information, and Third humidity set information). When a type of optional processing is the crisping processing, the set information indicates a temperature every predetermined time set to an instrument (i.e., a heater) included in the device 5 and a humidity every predetermined time set to an instrument (i.e., a humidifier) included in the device 5 in the travel period from the expective departure time from the store to the expective arrival time at the delivery destination.

The set information includes first temperature set information 322A, second temperature set information 322B, third temperature set information 322C, first humidity set information 323A, second humidity set information 323B, and third humidity set information 323C. On the set information input screen 321, an image showing the first temperature set information 322A is swiped to the left to thereby display an image showing the second temperature set information 322B. Further, the image showing the second temperature set information 322B is swiped to the left to thereby display an image showing the third temperature set information 322C. On the set information input screen 321, an image showing the first humidity set information 323A is swiped to the left to thereby display an image showing the second humidity set information 323B. Further, the image showing the second humidity set information 323B is swiped to the left to thereby display an image showing the third humidity set information 323C.

According to the first temperature set information 322A, a set temperature for an instrument included in the device 5 is controlled to be maintained at a predetermined degree in the travel period from the expective departure time from the store to the expective arrival time at the delivery destination. According to the second temperature set information 322B, the set temperature for the instrument included in the device 5 is controlled to gradually increase in the travel period from the expective departure time from the store to the expective arrival time at the delivery destination. According to the third temperature set information 322C, the set temperature for the instrument included in the device 5 is controlled to be maintained at a certain first degree in the first travel period from the expective departure time from the store to the midpoint passing time, and the set temperature for the instrument included in the device 5 is controlled to be maintained at a second degree higher than the first degree in the second travel period from the midpoint passing time to the expective arrival time at the delivery destination.

According to the first humidity set information 323A, a predetermined humidity is controlled to be maintained in the device 5 in the travel period from the expective departure time from the store to the expective arrival time at the delivery destination. According to the second humidity set information 323B, the humidity in the device 5 is controlled to gradually decrease in the first travel period from the expective departure time from the store to the midpoint passing time, and the humidity having been set for the midpoint passing time is controlled to be maintained in the device 5 in the second travel period from the midpoint passing time to the expective arrival time at the delivery destination. According to the third humidity set information 323C, an instrument (for example, a ventilator) is caused to operate at a predetermined time only for a certain time period in the travel period from the expective departure time from the store to the expective arrival time at the delivery destination.

Further, the set information input screen 321 includes a send button 324 for sending the input set information. The employee of the store inputs the set information for the device 5 to execute the optional processing. In the present embodiment, the employee of the store selects one of the first temperature set information, the second temperature set information, and the third temperature set information, and one of the first humidity set information, the second humidity set information, and the third humidity set information. When the send button 324 is touched, the store terminal 3 sends to the service provider server 1 the set information input by the employee of the store.

Figure 14:
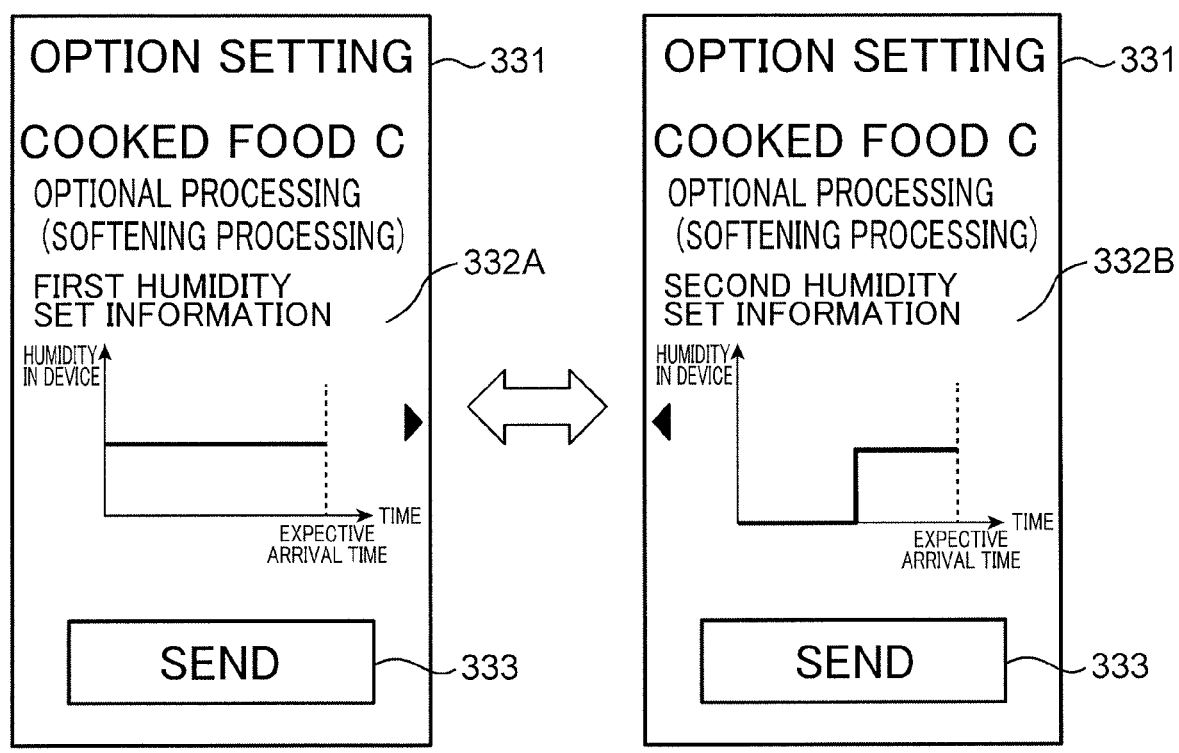
FIG. 14 is an illustration showing an exemplary set information input screen to be displayed on the store terminal when a type of optional processing is softening processing in the present embodiment.

FIG. 14 is an illustration showing an exemplary set information input screen to be displayed on the store terminal 3 when a type of optional processing is the softening processing in the present embodiment.

The set information input screen 331 shown in FIG. 14 displays a name of the product (i.e., Cooked food C), a type of the optional processing (i.e., Softening processing), and set information (First humidity set information and Second humidity set information). When a type of optional processing is the softening processing, the set information indicates a humidity every predetermined time set to an instrument (i.e., a humidifier) included in the device 5 in the travel period from the expective departure time from the store to the expective arrival time at the delivery destination.

The set information includes the first humidity set information 332A and the second humidity set information 332B. On the set information input screen 331, an image showing the first humidity set information 332A is swiped to the left to thereby display an image showing the second humidity set information 332B.

According to the first humidity set information 332A, a predetermined humidity is controlled to be maintained in the device 5 in the travel period from the expective departure time from the store to the expective arrival time at the delivery destination. According to the second humidity set information 332B, a first humidity is controlled to be maintained in the device 5 in the first travel period from the expective departure time from the store to the midpoint passing time, and a second humidity higher than the first humidity is controlled to be maintained in the device 5 in the second travel period from the midpoint passing time to the expective arrival time at the delivery destination.

Further, the set information input screen 331 includes a send button 333 for sending the input set information. The employee of the store inputs the set information for the device 5 to execute the optional processing. In the present embodiment, the employee of the store selects one of the first humidity set information and the second humidity set information. When the send button 333 is touched, the store terminal 3 sends the set information input by the employee of the store to the service provider server 1.

By referring again to FIG. 5, next, in Step S111, the communication part 13 in the service provider server 1 receives the set information for the device 5 sent from the store terminal 3.

Thereafter, in Step S112, the set information output part 116 sends to the deliverer terminal 4 the set information for the device 5 received by the communication part 13.

Subsequently, in Step S407, the deliverer terminal 4 receives the set information for the device 5 sent from the service provider server 1.

Thereafter, in Step S408, the deliverer terminal 4 displays the received set information for the device 5.

Thereafter, in Step S409, the deliverer terminal 4 sends to the device 5 the received set information for the device 5.

Figure 15:
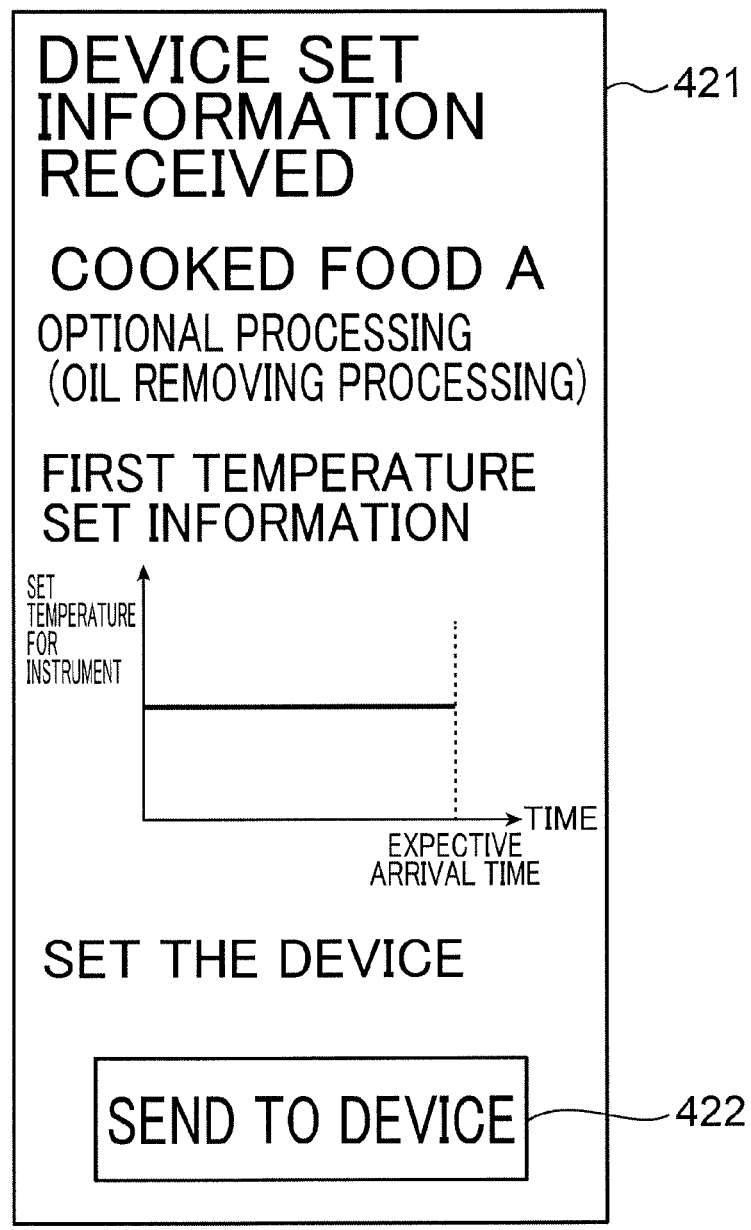
FIG. 15 is an illustration showing an exemplary set information presentation screen to be displayed on the deliverer terminal in the present embodiment.

FIG. 15 is an illustration showing an exemplary set information presentation screen to be displayed on the deliverer terminal 4 in the present embodiment.

The set information presentation screen 421 shown in FIG. 15 displays the name of the ordered product (i.e., Cooked food A), the type of the optional processing (i.e., Oil removing processing), and the set information (i.e., First temperature set information) for the device 5.

Further, the set information presentation screen 421 includes a send button 422 for sending the set information to the device 5. When the send button 422 is touched, the deliverer terminal 4 sends the set information to the device 5. The device 5 controls an instrument on the basis of the received set information. The set information indicates a set value for an instrument in a period from the expective departure time to the expective arrival time. When it is the expective departure time, an instrument included in the device 5 starts the operation on the basis of the set information.

By referring again to FIG. 6, next, in Step S410, the deliverer terminal 4 receives an input of the delivery start by the deliverer.

Subsequently, in Step S411, the deliverer terminal 4 sends to the service provider server 1 the delivery start notification information notifying that the deliverer has started the delivery from the store to the delivery destination.

Figure 16:
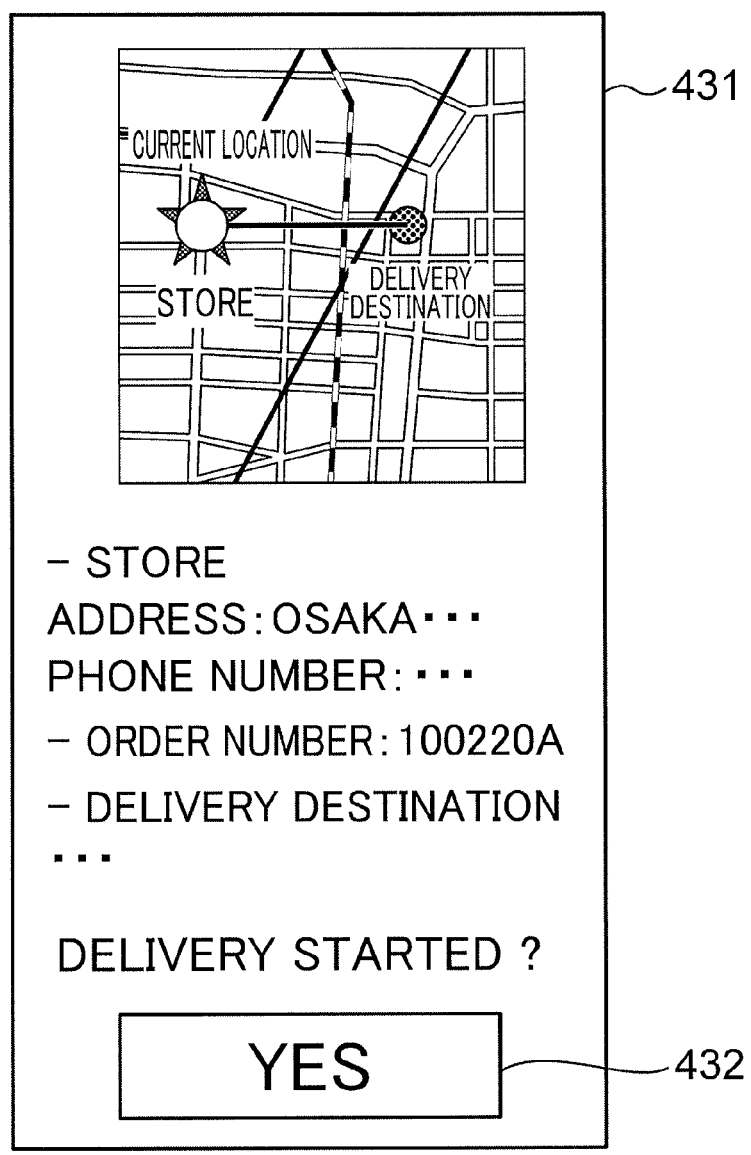
FIG. 16 is an illustration showing an exemplary delivery start input screen to be displayed on the deliverer terminal in the present embodiment.

FIG. 16 is an illustration showing an exemplary delivery start input screen to be displayed on the deliverer terminal 4 in the present embodiment.

After having sent the set information to the device 5, the deliverer terminal 4 displays the delivery start input screen 431. The delivery start input screen 431 shown in FIG. 16 displays the map, the location of the store, the location of the delivery destination, and the order number for identifying the order. On the map, the icon indicative of the location of the store, the icon indicative of the location of the delivery destination, and the icon indicative of the current location of the deliverer are displayed.

Further, the delivery start input screen 431 includes a button 432 which allows the deliverer to input the delivery start. When the button 432 is touched, the deliverer terminal 4 sends to the service provider server 1 the delivery start notification information notifying that the deliverer has started the delivery from the store to the delivery destination. Thereafter, the deliverer moves toward the delivery destination displayed on the delivery start input screen 431 with the product placed in the device 5.

In the present embodiment, when it is the expective departure time, an instrument included in the device 5 automatically starts the operation on the basis of the set information. However, the present disclosure is not particularly limited to this embodiment. The deliverer terminal 4 may send the delivery start notification information to the device 5. When the delivery start notification information is received, an instrument included in the device 5 may start the operation on the basis of the set information. Alternatively, the device 5 may be provided with a start button for starting the operation on the basis of the set information. An instrument included in the device 5 may start the operation on the basis of the set information when the start button is pressed by the deliverer.

By referring again to FIG. 6, next, in Step S113, the communication part 13 in the service provider server 1 receives the delivery start notification information sent from the deliverer terminal 4.

Subsequently, in Step S114, the delivery management part 117 sends to the orderer terminal 2 the deliverer location information indicative of a current location of the deliverer. The service provider server 1 receives a current location periodically sent from the deliverer terminal 4.

Subsequently, in Step S205, the orderer terminal 2 receives the deliverer location information sent from the service provider server 1.

Thereafter, in Step S206, the orderer terminal 2 displays the delivery progress screen showing the current location of the deliverer on the basis of the received deliverer location information.

Figure 17:
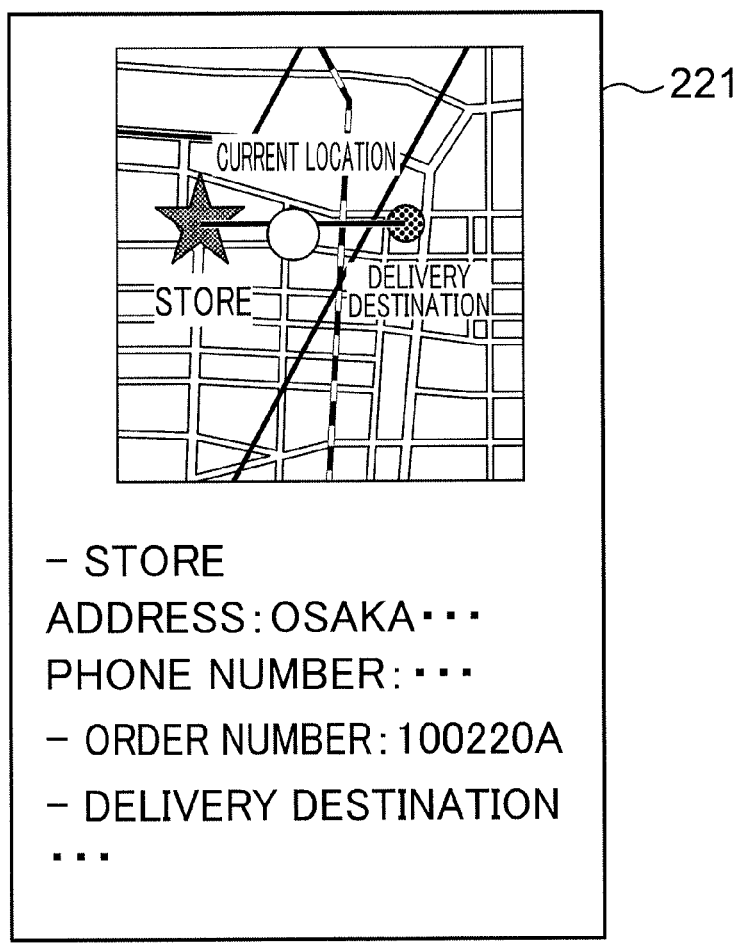
FIG. 17 is an illustration showing an exemplary delivery progress screen to be displayed on an orderer terminal in the present embodiment.

FIG. 17 is an illustration showing an exemplary delivery progress screen to be displayed on the orderer terminal 2 in the present embodiment.

The delivery progress screen 221 shown in FIG. 17 displays the map, the location of the store, the location of the delivery destination, and the order number for identifying the order. On the map, the icon indicative of the location of the store, the icon indicative of the location of the delivery destination, and the icon indicative of the current location of the deliverer are displayed. The delivery management part 117 periodically sends the deliverer location information to the orderer terminal 2, and the orderer terminal 2 displays a refreshed delivery progress screen on the basis of the received deliverer location information. This updates the orderer on where the deliverer is currently located by seeing the delivery progress screen 221. The store terminal 3 may also display the delivery progress screen 221.

By referring again to FIG. 6, next, in Step S412, the deliverer terminal 4 receives an input of the delivery completion by the deliverer.

Thereafter, in Step S413, the deliverer terminal 4 sends to the service provider server 1 the delivery completion notification information notifying that the deliverer has completed the delivery.

Figure 18:
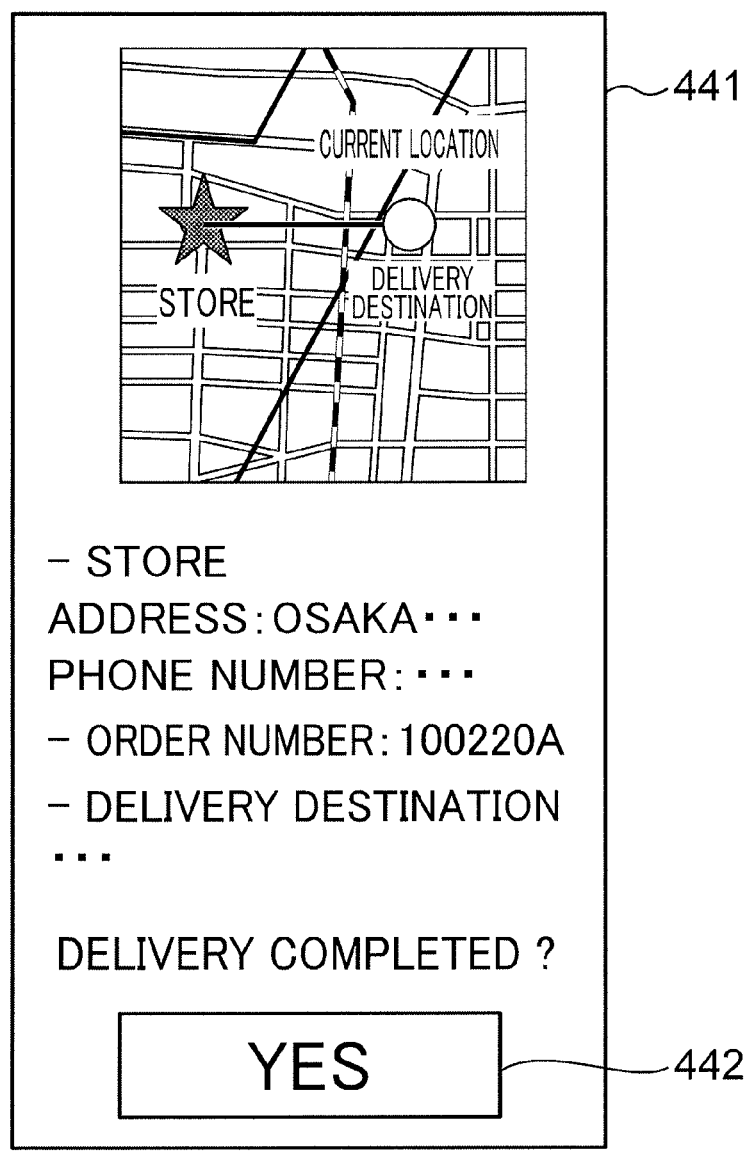
FIG. 18 is an illustration showing an exemplary delivery completion input screen to be displayed on the deliverer terminal in the present embodiment.

FIG. 18 is an illustration showing an exemplary delivery completion input screen to be displayed on the deliverer terminal 4 in the present embodiment.

After having sent the delivery start notification information to the service provider server 1, the deliverer terminal 4 displays the delivery completion input screen 441. The delivery completion input screen 441 shown in FIG. 18 displays the map, the location of the store, the location of the delivery destination, and the order number for identifying the order. On the map, the icon indicative of the location of the store, the icon indicative of the location of the delivery destination, and the icon indicative of the current location of the deliverer are displayed.

Further, the delivery completion input screen 441 includes a button 442 which allows the deliverer to input the delivery completion. After having arrived at the delivery destination and having delivered the product to the orderer, the deliverer touches the button 442. When the button 442 is touched, the deliverer terminal 4 sends to the service provider server 1 the delivery completion notification information notifying that the deliverer has completed the delivery. Here, the deliverer terminal 4 includes a time when the button 442 is touched in the delivery completion notification information as the arrival time when the deliverer has actually arrived at the delivery destination.

By referring again to FIG. 6, next, in Step S115, the communication part 13 of the service provider server 1 receives the delivery completion notification information sent from the deliverer terminal 4. The delivery management part 117 may send to the store terminal 3 the delivery completion notification information notifying that the deliverer has completed the delivery when receiving the delivery completion notification information from the deliverer terminal 4. When receiving delivery completion notification information, the store terminal 3 may display a delivery completion screen notifying that the delivery has been completed.

Subsequently, in Step S116, the billing processing part 118 executes the billing processing of determining the amount to be collected from the orderer. The billing processing part 118 refuses a payment of the fee for the optional processing from the orderer when a difference between the arrival time included in the delivery completion notification information and the expective arrival time calculated by the expective arrival time calculation part 114 is not smaller than a predetermined time period.

Accordingly, determination is made about a deliverer who has a device 5 capable of executing optional processing to be applied to the product and satisfying a variety of taste of the orderer, and delivers the product from a store to a delivery destination designated by the orderer. Subsequently, set information concerning the device 5 to execute the optional processing to be applied to the product in a delivery way from the store to the delivery destination is sent to a terminal 4 of the deliverer or the device 5. Since the device 5 applies the optional processing to the product using the set information in the delivery way from the store to the delivery destination, a product satisfying a variety of taste of an orderer can be provided.

According to the present embodiment, a delivery candidate is determined to be a deliverer when the device discrimination information input by the delivery candidate coincides with the device discrimination information associated with the type of the optional processing in the order information. However, there is still the possibility that a delivery candidate misrecognizes the type of the device, or that the device fails to adjust a temperature and/or a humidity due to a deterioration or a malfunction of the device. Accordingly, the store terminal 3 may acquire device discrimination information encoded in a two-dimensional code attached on a surface of the device by reading the two-dimensional code. Thereafter, the store terminal 3 may send the acquired device discrimination information to the service provider server 1. The service provider server 1 may judge whether or not the received device discrimination information coincides with the device discrimination information associated with the type of the optional processing in the order information. This can verify whether a device held by a deliverer is capable of executing the optional processing or not, thereby preventing the occurrence of a failure that the optional processing is not applied to a product during a delivery.

Further, the service provider server 1 may send to the deliverer terminal 4 determination notification information including test set information causing the device 5 held by the determined deliverer to conduct a test operation while being set with set contents corresponding to the optional processing. The deliverer terminal 4 may send to the device 5 the test set information included in the received determination notification information, and cause an instrument in the device 5 to conduct the test operation in accordance with the test set information in a period when the deliverer moves to the store. Thereafter, the deliverer terminal 4 may acquire a test operation result of the device 5, and send to the service provider server 1 the acquired test operation result. The service provider server 1 may judge whether or not the device 5 operates in accordance with the test set information on the basis of the test operation result received from the deliverer terminal 4. When judging that the device 5 operates in accordance with the test set information, the service provider server 1 judges that the device 5 held by the deliverer is capable of executing the optional processing. On the other hand, when judging that the device 5 does not operate in accordance with the test set information, the service provider server 1 may judge that the device 5 held by the deliverer is not capable of executing the optional processing, and send an offer to another deliverer.

In the present embodiment, the device 5 may be set with the set information for a duration from a time when the deliverer departs from the store to the expective arrival time (i.e., a first expective arrival time) before the deliverer departs from the store to the delivery destination. The expective arrival time calculation part 114 may calculate an expective arrival time (i.e., a second expective arrival time) when the deliverer is expected to arrive at the delivery destination at a predetermined time point in the delivery way from the store to the delivery destination. The predetermined time point is, for example, an intermediate time between the expective departure time and the expective arrival time. When the second expective arrival time is later than the first expective arrival time, the set information generation part 115 may generate set information of maintaining contents having been set for the predetermined time point in the delivery way in a duration of a time difference between the second expective arrival time and the first expective arrival time. The set information output part 116 may send the generated set information to the deliverer terminal 4 or the device 5. According to this configuration, even when it is seen that the deliverer is likely to arrive later than the expective arrival time, the set information of maintaining contents having been set for a predetermined time point in the delivery way is sent to the deliverer terminal 4 or the device 5. Accordingly, the optional processing can be reliably applied to the product.

In the present embodiment, the service provider server 1 receives set information for the device 5 having been input by the store terminal 3, and sends the received set information to the deliverer terminal 4. However, the present disclosure is not particularly limited to this embodiment. The service provider server 1 may store in advance a table where a type of optional processing and set information for a device 5 corresponding to the optional processing are associated with each other. In this case, the service provider server 1 may read from the table the set information associated with the type of the optional processing in the order information, and send the read set information to the deliverer terminal 4. This eliminates the need for an input of the set information to the store terminal 3, and consequently reduces the processing workload for the store.

In the present embodiment, the inside space of the device 5 may be divided into a plurality of spaces. For each of the spaces, a climate may be set individually. In this case, a plurality of different products may be stored in the respective spaces in the device 5, and different optional processings may be applied to the respective products.

Each constituent element may be constituted by a dedicated hardware or may be implemented by executing a software program suitable for each constituent element in each of the above embodiments. Each constituent element may be implemented by a program execution unit such as a CPU or a processor reading and executing a software program stored in a recording medium such as a hard disk or a semiconductor memory. Further, a program may be implemented by another independent computer system by recording the program on storage medium and transferring the program, or by transferring the program via a network.

Some or all of functions of the devices according to the embodiments of the present disclosure are typically implemented as a large scale integration (LSI) that is an integrated circuit. The functions may be individually integrated into respective chips, or may be integrated into a single chip encompassing some or all of the functions. The integrated circuit is not limited to the LSI, and may be implemented by a dedicated circuit or a general-purpose processor. A field programmable gate array (FPGA) that can be programmed after manufacturing an LSI, or a reconfigurable processor where connection and setting of circuit cells inside an LSI are reconfigurable may be used.

In addition, some or all of functions of the devices according to the embodiments of the present disclosure may be implemented by a processor such as a CPU executing a program.

The numbers used above are merely examples for specifically describing the present disclosure, and the present disclosure is not limited to the illustrated numbers.

The order in which the steps shown in the above flowcharts are performed is merely an example for specifically describing the present disclosure, and any order other than the above may be available as long as a similar effect can be obtained. Some of the above steps may be performed simultaneously (in parallel) with another step.

The technology according to the present disclosure enables offering a product that satisfies a variety of taste of an orderer, and thus is useful as a technology for determining a deliverer who delivers a product from a store to a delivery destination.

The invention claimed is:

1. An information processing method, by a computer, comprising:
   receiving, from a terminal of an orderer, order information concerning a cooked food or a foodstuff provided by a store and a type of optional processing applied to the cooked food or the foodstuff;
   determining a deliverer who has a device capable of executing the optional processing, and delivers the cooked food or the foodstuff from the store to a delivery destination designated by the orderer, the device including at least one of a heater, a humidifier, a ventilator or a ventilation window;
   sending set information to a terminal of the deliverer or the device, the set information causing the device to execute the optional processing applied to the cooked food or the foodstuff in a delivery way from the store to the delivery destination, by automatically controlling the at least one of a heater, a humidifier, a ventilator or a ventilation window;
   calculating a first expective arrival time when the deliverer is expected to arrive at the delivery destination, before the deliverer departs from the store to the delivery destination, wherein
   the device is set with the set information for a duration from a time of departing from the store to the first expective arrival time, before the deliverer departs from the store to the delivery destination, and the device automatically controls the at least one of the heater, the humidifier, the ventilator or the ventilation window based on the set information, when the time of departing from the store comes, calculating a second expective arrival time at a predetermined time point in the delivery way from the store to the delivery destination when the deliverer is expected to arrive at the delivery destination; and sending, when the second expective arrival time is later than the first expective arrival time, to the terminal of the deliverer or the device, additional set information, wherein the additional set information causes the device to automatically control the at least one of the heater, the humidifier, the ventilator or the ventilation window to maintain contents having been set for the predetermined time point in the delivery way in a duration of a time difference between the second expective arrival time and the first expective arrival time.

2. The information processing method according to claim 1, wherein the optional processing includes processing of maintaining a state of the cooked food or the foodstuff, or processing of changing the state of the cooked food or the foodstuff, by automatically controlling the at least one of the heater, the humidifier, the ventilator or the ventilation window based on the set information.

3. The information processing method according to claim 2, wherein the processing of maintaining the state of the cooked food or the foodstuff, or the processing of changing the state of the cooked food or the foodstuff includes processing of adjusting at least one of a temperature and a water content of the cooked food or the foodstuff, by controlling the at least one of the heater, the humidifier, the ventilator or the ventilation window based on the set information.

4. The information processing method according to claim 3, wherein the set information includes information about at least one of a temperature and a humidity every predetermined time in the delivery way from the store to the delivery destination.

5. The information processing method according to claim 3, wherein the set information concerns at least one of a frequency and a time of executing a function of the device corresponding to the processing of maintaining the state of the cooked food or the foodstuff, or the processing of changing the state of the cooked food or the foodstuff in the delivery way from the store to the delivery destination.

6. The information processing method according to claim 1, further comprising:

sending the order information to a terminal of the store; and receiving the set information input on the basis of the order information by the terminal of the store.

7. The information processing method according to claim 1, further comprising:

setting a fee for the optional processing;

acquiring an arrival time when the deliverer actually arrives at the delivery destination; and refusing a payment of the fee from the orderer when a difference between the arrival time and the first expective arrival time is not smaller than a predetermined time period.

8. The information processing method according to claim 1, wherein in the determination of the deliverer, offer information of catching a deliverer who delivers the product is sent to terminals of delivery candidates, application information including device discrimination information of discriminating a device held by a delivery candidate is received from the terminal of the delivery candidate, a judgement is made on the basis of the device discrimination information as to whether the device is capable of executing the optional processing, and the delivery candidate is determined to be the deliverer when the device is judged to execute the optional processing.

9. An information processing apparatus, comprising:

a circuit that performs operations including:

receiving from a terminal of an orderer order information concerning a cooked food or a foodstuff provided by a store, and a type of optional processing applied to the cooked food or the foodstuff;

determining a deliverer who has a device capable of executing the optional processing, and delivers the cooked food or the foodstuff from the store to a delivery destination designated by the orderer, the device including at least one of a heater, a humidifier, a ventilator or a ventilation window;

sending set information to a terminal of the deliverer or the device, the set information causing the device to execute the optional processing applied to the cooked food or the foodstuff in a delivery way from the store to the delivery destination, by automatically controlling the at least one of a heater, a humidifier, a ventilator or a ventilation window;

calculating a first expective arrival time when the deliverer is expected to arrive at the delivery destination, before the deliverer departs from the store to the delivery destination, wherein the device is set with the set information for a duration from a time of departing from the store to the first expective arrival time, before the deliverer departs from the store to the delivery destination, and the device automatically controls the at least one of the heater, the humidifier, the ventilator or the ventilation window based on the set information, when the time of departing from the store comes, calculating a second expective arrival time at a predetermined time point in the delivery way from the store to the delivery destination when the deliverer is expected to arrive at the delivery destination; and sending, when the second expective arrival time is later than the first expective arrival time, to the terminal of the deliverer or the device, additional set information, wherein the additional set information causes the device to automatically control the at least one of the heater, the humidifier, the ventilator or the ventilation window to maintain contents having been set for the predetermined time point in the delivery way in a duration of a time difference between the second expective arrival time and the first expective arrival time.

10. A non-transitory computer readable recording medium storing an information processing program causing a computer to execute:

receiving from a terminal of an orderer order information concerning a cooked food or a foodstuff provided by a store, and a type of optional processing applied to the cooked food or the foodstuff;

determining a deliverer who has a device capable of executing the optional processing, and delivers the cooked food or the foodstuff from the store to a delivery destination designated by the orderer, the device including at least one of a heater, a humidifier, a ventilator or a ventilation window;

sending set information to a terminal of the deliverer or the device, the set information causing the device to execute the optional processing applied to the cooked food or the foodstuff in a delivery way from the store to the delivery destination, by automatically controlling the at least one of a heater, a humidifier, a ventilator or a ventilation window;

calculating a first expective arrival time when the deliverer is expected to arrive at the delivery destination, before the deliverer departs from the store to the delivery destination, wherein the device is set with the set information for a duration from a time of departing from the store to the first expective arrival time, before the deliverer departs from the store to the delivery destination, and the device automatically controls the at least one of the heater, the humidifier, the ventilator or the ventilation window based on the set information, when the time of departing from the store comes, calculating a second expective arrival time at a predetermined time point in the delivery way from the store to the delivery destination when the deliverer is expected to arrive at the delivery destination; and sending, when the second expective arrival time is later than the first expective arrival time, to the terminal of the deliverer or the device, additional set information, wherein the additional set information causes the device to automatically control the at least one of the heater, the humidifier, the ventilator or the ventilation window to maintain having been set for the predetermined time point in the delivery way in a duration of a time difference between the second expective arrival time and the first expective arrival time.

* * * * *